United States Patent
Watanabe et al.

(10) Patent No.: US 10,717,373 B2
(45) Date of Patent: Jul. 21, 2020

(54) SEAT SLIDE DEVICE

(71) Applicant: Toyota Body Seiko Co., LTD., Takahama-Shi, Aichi (JP)

(72) Inventors: Hisato Watanabe, Takahama (JP); Shin Shiraki, Takahama (JP); Motohisa Nakamura, Takahama (JP); Takuo Yanagihara, Takahama (JP)

(73) Assignee: Toyota Body Seiko Co., LTD., Takahama-Shi (JP)

( * ) Notice: Subject to any disclaimer, the term of this patent is extended or adjusted under 35 U.S.C. 154(b) by 152 days.

(21) Appl. No.: 15/632,193

(22) Filed: Jun. 23, 2017

(65) Prior Publication Data
US 2017/0368963 A1   Dec. 28, 2017

(30) Foreign Application Priority Data

Jun. 27, 2016  (JP) .................................. 2016-126291
Feb. 10, 2017  (JP) .................................. 2017-023131

(51) Int. Cl.
*B60N 2/08*  (2006.01)
*B60N 2/07*  (2006.01)
*B60N 2/20*  (2006.01)

(52) U.S. Cl.
CPC .......... *B60N 2/0881* (2013.01); *B60N 2/0715* (2013.01); *B60N 2/0722* (2013.01); *B60N 2/0818* (2013.01); *B60N 2/0843* (2013.01); *B60N 2/20* (2013.01)

(58) Field of Classification Search
CPC ...... B60N 2/07; B60N 2/0727; B60N 2/0705; B60N 2/0818; B60N 2/0862; B60N 2/0875; B60N 2/0881
See application file for complete search history.

(56) References Cited

U.S. PATENT DOCUMENTS

| 4,511,187 A | 4/1985 | Rees |
| 6,109,584 A | 8/2000 | Garrido |
| 8,955,814 B2 | 2/2015 | Moriyama et al. |

(Continued)

FOREIGN PATENT DOCUMENTS

| JP | H10-100752 A | 4/1998 |
| JP | 2013-18439 A | 1/2013 |

(Continued)

OTHER PUBLICATIONS

U.S. Appl. No. 15/325,889, filed Jan. 12, 2017, Nakamura et al.

(Continued)

*Primary Examiner* — Eret C McNichols
(74) *Attorney, Agent, or Firm* — Wolf, Greenfield & Sacks, P.C.

(57) ABSTRACT

A seat slide device that can adjust sliding resistance of sliding of an upper rail with respect to a lower rail in an unlock state is provided. The seat slide device is provided in a vehicle and includes a lower rail fixed to a floor of a vehicle, an upper rail fixed to a seat of the vehicle and supported to be capable of sliding with respect to the lower rail, a lock mechanism configured to switch a lock state in which movement of the upper rail is restricted and an unlock state in which the movement of the upper rail is allowed, and an adjusting mechanism configured to adjust sliding resistance of sliding of the upper rail with respect to the lower rail in the unlock state.

8 Claims, 18 Drawing Sheets

(56) References Cited

U.S. PATENT DOCUMENTS

| | | | |
|---|---|---|---|
| 10,040,374 B2 * | 8/2018 | Nakamura | B60N 2/07 |
| 2004/0089785 A1 | 5/2004 | Mccullen | |
| 2011/0233366 A1 * | 9/2011 | Mizuno | B60N 2/0705 |
| | | | 248/429 |
| 2012/0061547 A1 | 3/2012 | Moriyama | |
| 2012/0061548 A1 * | 3/2012 | Moriyama | B60N 2/0292 |
| | | | 248/430 |
| 2012/0133187 A1 * | 5/2012 | Ootsuka | B60N 2/0296 |
| | | | 297/354.12 |
| 2013/0015312 A1 | 1/2013 | Shiraki | |
| 2014/0110554 A1 | 4/2014 | Oya | |
| 2015/0001366 A1 * | 1/2015 | Nakashima | B60N 2/0722 |
| | | | 248/429 |
| 2016/0280098 A1 * | 9/2016 | Frye | B60N 2/0228 |
| 2016/0339808 A1 | 11/2016 | Mizuno | |
| 2017/0144569 A1 | 5/2017 | Nakamura et al. | |
| 2018/0105074 A1 | 4/2018 | Shiraki | |

FOREIGN PATENT DOCUMENTS

| | | | | |
|---|---|---|---|---|
| WO | WO 2016/009495 A | 1/2016 | | |
| WO | WO-2016009495 A1 * | 1/2016 | | B60N 2/07 |

OTHER PUBLICATIONS

PCT/JP2014/068800, Oct. 7, 2014, International Search Report and Written Opinion.
U.S. Appl. No. 15/725,975, filed Oct. 5, 2017, Shiraki.
International Search Report and Written Opinion for International Application No. PCT/JP2014/068800, dated Oct. 7, 2014.

* cited by examiner

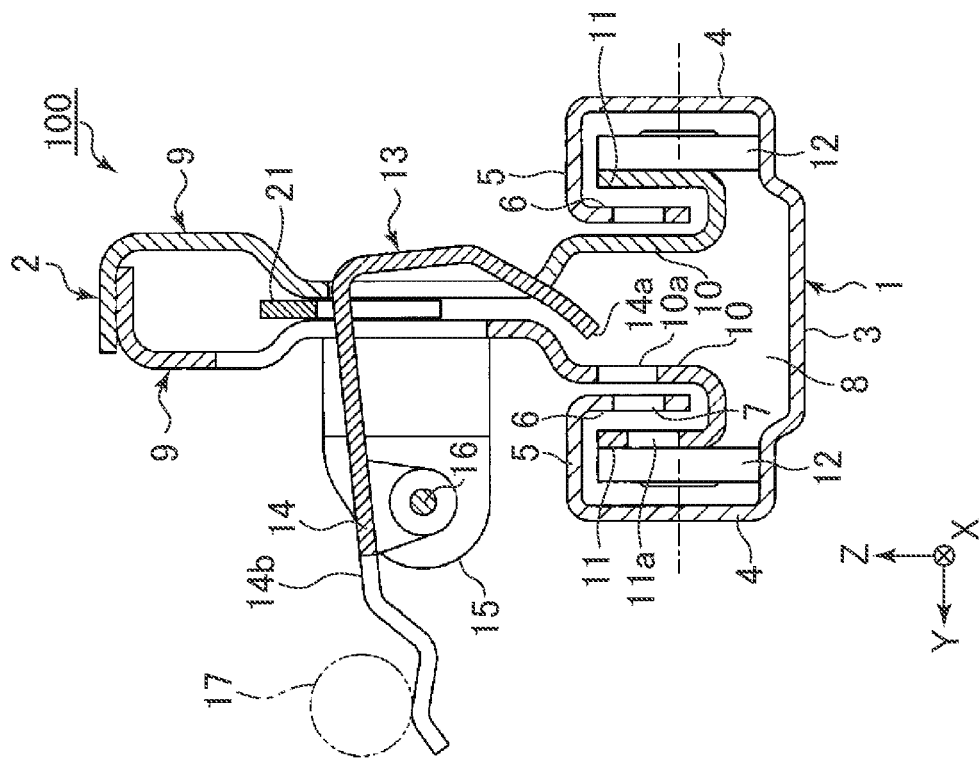
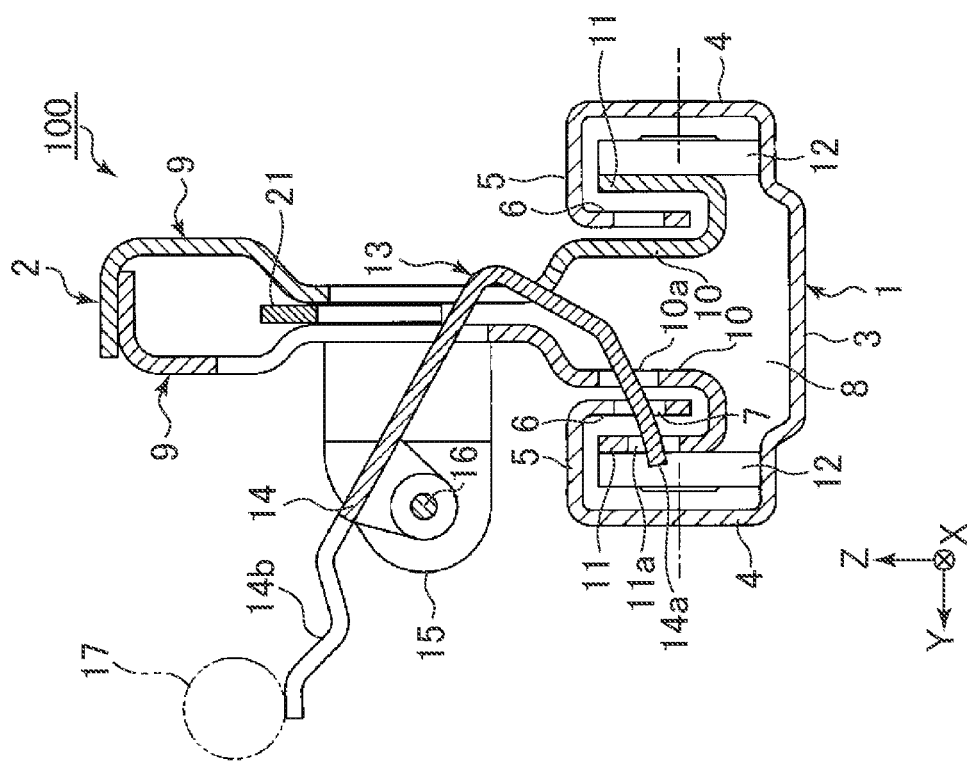

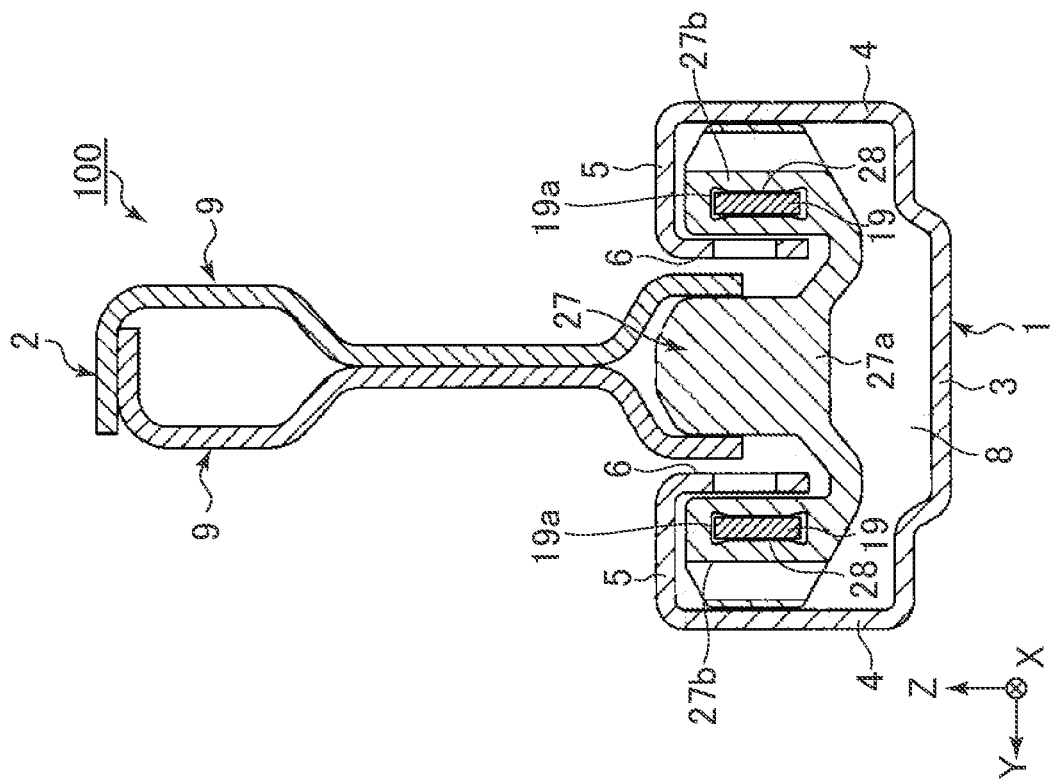
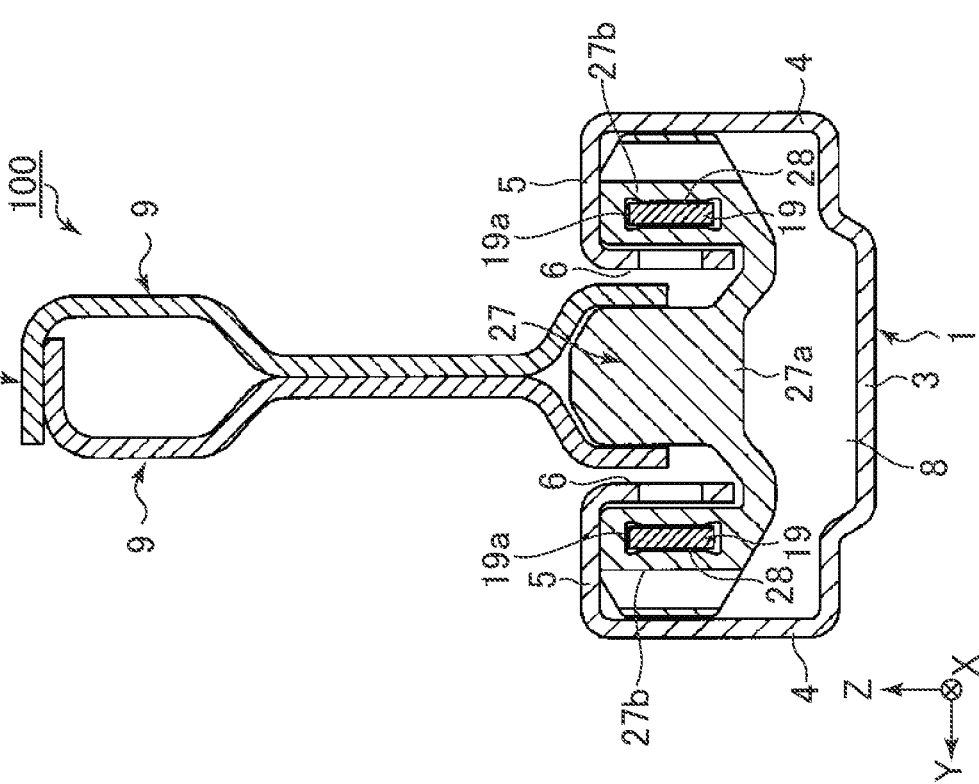

SEAT SLIDE DEVICE

RELATED CASE INFORMATION

Foreign priority benefits are claimed under 35 U.S.C. § 119(a)-(d) or 35 U.S.C. § 365(b) to Japanese application number 2016-126291, filed on Jun. 27, 2016, and Japanese application number 2017-023131, filed on Feb. 10, 2017, both of which are incorporated herein by reference in their entirety.

BACKGROUND OF THE INVENTION

Field of the Invention

The present invention relates to a seat slide device provided in a vehicle.

Description of the Related Art

A seat slide device described in International Publication No. WO 2016/009495 (Patent Literature 1) can slide a seat provided in a vehicle in the front-back direction. The seat slide device includes a lower rail fixed to a floor of the vehicle and an upper rail fixed to the bottom of the seat. The upper rail is supported to be capable of sliding in the longitudinal direction with respect to the lower rail.

The seat slide device includes a lock mechanism for switching, on the basis of handle operation performed by an occupant, a lock state in which the movement of the upper rail is restricted and an unlock state in which the movement of the upper rail is allowed. For example, at a normal time when the vehicle is traveling, the seat slide device is set in the lock state. In the unlock state, the seat slide device can slide the seat in the front-back direction together with the upper rail.

In the seat slide device described in Patent Literature 1, in the unlock state, sliding resistance against the lower rail in sliding the upper rail to a forward side is set properly large. Sliding resistance against the lower rail in sliding the upper rail to a rearward side is set small. That is, the sliding resistance in sliding the seat to the rearward side is set smaller than the sliding resistance in sliding the seat to the forward side. As a result, with the seat slide device having the configuration explained above, it is possible to improve the stability of the sliding in the unlock state in the seat slide device configured to easily slide the upper rail with respect to the lower rail at the time of the forward sliding.

For example, in a vehicle including seats in three rows, a seat in a second row, on which an occupant does not sit, is sometimes lid forward to secure an entrance to a seat in a third row. However, in the seat slide device, since the sliding resistance of the upper rail at the time of the forward sliding is larger, it is hard to slide the seat forward. Therefore, it is desirable that the sliding resistance of the upper rail can be changed in the unlock state.

SUMMARY OF THE INVENTION

The present invention has been devised in view of such a problem, and an object of the present invention to provide a seat slide device that can adjust sliding resistance of sliding of an upper rail with respect to a lower rail in an unlock state.

In order to solve the problem, a seat slide device according to the present invention is a seat slide device provided in a vehicle, the seat slide device including: a lower rail fixed to a floor of a vehicle; an upper rail fixed to a seat of the vehicle and supported to be capable of sliding with respect to the lower rail; a lock mechanism configured to switch a lock state in which movement of the upper rail is restricted and an unlock state in which the movement of the upper rail is allowed; and an adjusting mechanism configured to adjust sliding resistance of sliding of the upper rail with respect to the lower rail in the unlock state.

In the seat slide device, the adjusting mechanism is configured to change the sliding resistance between a first condition in which the sliding resistance is set to first sliding resistance at a time of movement in a first direction and set to second sliding resistance smaller than the first sliding resistance at a time of movement in a second direction opposite to the first direction and a second condition in which the sliding resistance is set to third sliding resistance smaller than the first sliding resistance at the time of the movement in the first direction and set to fourth sliding resistance smaller than the first sliding resistance at the time of the movement in the second direction. In this case, the third sliding resistance and the fourth sliding resistance are smaller than the second sliding resistance. The first condition is a condition at a sitting time when an occupant sits on the seat. The second condition is a condition at a non-sitting time when the occupant does not sit on the seat.

In the seat slide device, the adjusting mechanism is configured to change the sliding resistance between a sitting time when an occupant sits on the seat and a non-sitting time when the occupant does not sit on the seat. The adjusting mechanism is configured to switch the sitting time and the non-sitting time in association with a folding motion for folding a seatback of the seat with respect to a seat cushion.

The seat slide device according to the present invention further includes a sensor configured to detect inclination of the seat slide device. The adjusting mechanism is configured to adjust the sliding resistance according to the inclination of the seat slide device detected by the sensor.

According to the present invention, it is possible to provide the seat slide device that can adjust the sliding resistance of the sliding of the upper rail with respect to the lower rail in the unlock state.

BRIEF DESCRIPTION OF THE DRAWINGS

FIGS. 2A and 2B are sectional views taken along line II-II in FIG. 1A;

FIG. 5A is an enlarged sectional view taken along line V-V in FIG. 3;

FIG. 5B is an enlarged sectional view taken along line V-V in FIG. 4;

DETAILED DESCRIPTION OF THE PREFERRED EMBODIMENTS

Figure 1A:
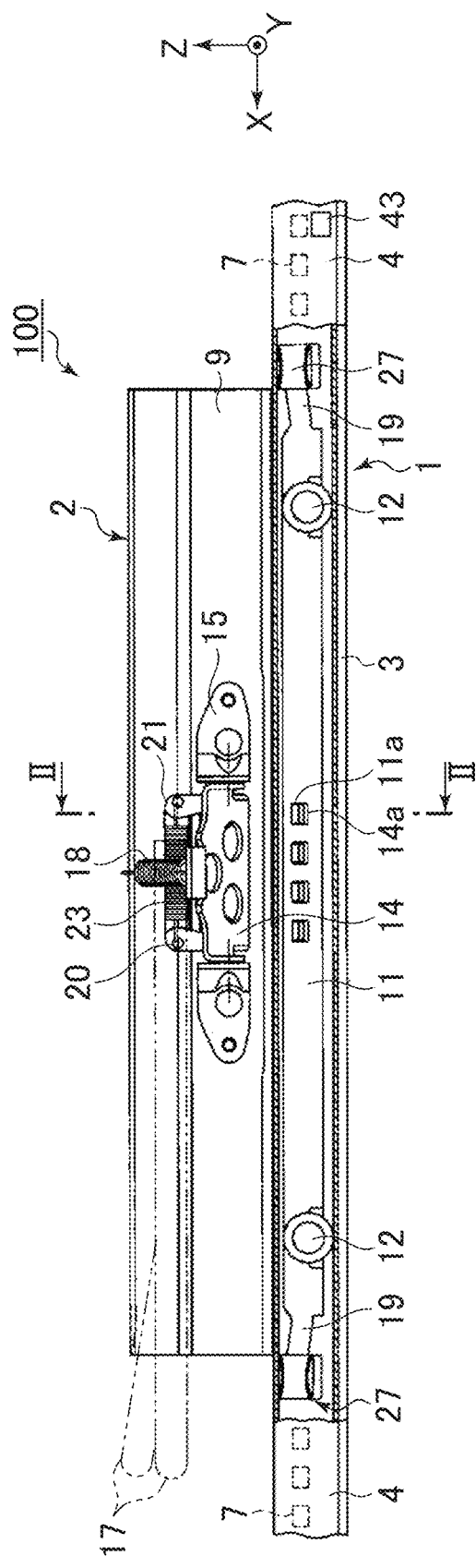
FIG. 1A is a side view schematically showing the structure of a seat slide device according to a first embodiment of the present invention.

Embodiments of the present invention are explained below with reference to the accompanying drawings. To facilitate understanding of the explanation, the same reference numerals and signs denote the same components in the drawings as much as possible. Redundant explanation of the components is omitted.

Figure 1B:
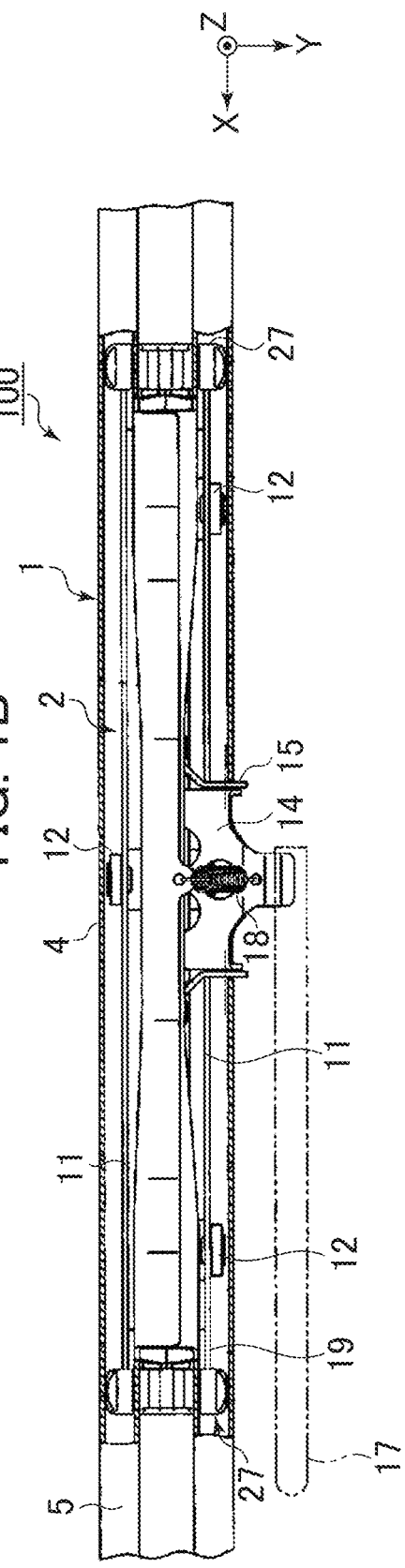
FIG. 1B is a plan view schematically showing the structure of the seat slide device according to the first embodiment of the present invention.

FIG. 1A is a side view schematically showing the structure of a seat slide device 100 according to a first embodiment of the present invention. FIG. 1B is a plan view of the structure of the seat slide device 100. The seat slide device 100 is a device that is provided between a floor and a seat (both of which are not shown in the figure) of a vehicle and supports the seat in a state in which the seat is capable of sliding in the front-back direction. In this embodiment, a scene is assumed in which a pair of seat slide devices 100 is integrated in a seat in a second row of a vehicle, that is, a passenger car including seats in three rows.

In FIGS. 1A and 1B, a direction from the rearward side to the forward side of the vehicle is represented as an x direction. An x axis is set in the x direction. A direction from the right side to the left side of the vehicle is represented as a y direction. A y axis is set in the y direction. Further, a direction from the lower side to the upper side of the vehicle is represented as a z direction. A z axis is set in the z direction. In the drawings following FIGS. 1A and 1B, the x axis, the y axis, and the z axis are set in the same manner. Therefore, the front-back direction of the vehicle is a ±x direction, the width direction of the vehicle is a ±y direction, and the height direction of the vehicle is a ±z direction.

The seat includes a seat cushion on which an occupant of the vehicle sits, a seatback configuring a backrest for the occupant, and a headrest that supports the head of the occupant. The seatback can swing over a predetermined swing angle with respect to the seat cushion around a swinging shaft parallel to the y axis. In general, for example, when the seat in the second row is slid in the forward direction of the vehicle in order to secure an entrance to a seat in a third row, the seatback is folded with respect to the seat cushion around the swinging shaft to take a folded posture.

The seat slide device 100 includes a lower rail 1 and an upper rail 2. The lower rail 1 is a member fixed to the floor of the vehicle. The upper rail 2 is a member fixed to the bottom surface of the seat of the vehicle. Two sets of the lower rails 1 and the upper rails 2 fixed to one seat are provided in parallel to be arranged side by side along the left-right direction of the vehicle in a state in which the longitudinal directions of the two sets of the lower rails 1 and the upper rails 2 are set along the front-back direction of the vehicle. The upper rail 2 is supported to be capable of sliding along the x axis with respect to the lower rail 1.

FIGS. 2A and 2B are enlarged sectional views taken along line II-II in FIG. 1A. FIG. 2A is a diagram showing a lock state explained below. FIG. 2B is a diagram showing an unlock state explained below. Referring to FIGS. 2A and 2B together, the lower rail 1 is formed by bending from one metal plate. The lower rail 1 includes a bottom plate section 3, side plate sections 4, 4 respectively extending upward from both ends of the bottom plate section 3, upper plate sections 5, 5 respectively extending inward from the upper ends of the side plate sections 4, 4, and dead plate sections 6, 6 respectively extending downward from the inner end portions of the upper plate sections 5, 5.

As it is evident from FIGS. 2A and 2B, the bottom plate section 3 is opposed to the upper plate sections 5, 5 and the side plate sections 4, 4 are respectively opposed to the dead plate sections 6, 6. The dead plate sections 6, 6 are disposed to be separated from each other. Gaps are formed between the lower ends of the dead plate sections 6, 6 and the bottom plate section 3. For example, a plurality of openings 7 are formed in the dead plate section 6. As shown in FIG. 1A, the openings 7 are arrayed in one row along the x axis.

Among spaces formed on the inside of the lower rail 1, a space surrounded by the bottom plate section 3, the side plate sections 4, the upper plate sections 5, and the dead plate sections 6 configures a housing space 8 for the upper rail 2. The housing space 8 is opened upward between the dead plate sections 6, 6. A part, that is, a lower side section of the upper rail 2 is housed in the housing space 8. A part, that is, an upper side section of the upper rail 2 projects upward from a part opened upward in the lower rail 1.

The upper rail 2 includes a pair of metal plates 9, 9 laid one on top of the other. The metal plates 9 include a pair of side plate sections 10, 10 disposed in the housing space 8 and opposed to the dead plate sections 6 of the lower rail 1 and a pair of arm plate sections 11, 11 bending from the side plate sections 10 and opposed to the side plate sections 4 and the dead plate sections 6. That is, the pair of arm plate sections 11, 11 are portions formed to bend from the lower sides of the side plate sections 10 and extend vertically upward.

In the side plate section 10 disposed on the +y direction side of the pair of side plate sections 10, 10, for example, a plurality of rectangular openings 10a are formed. Similarly, in the arm plate section 11 disposed on the +y direction side of the pair of arm plate sections 11, 11, for example, a plurality of rectangular openings 11a are formed. The shapes and disposition intervals of the openings 10a and 11a are equal to the shape and a disposition interval of the openings 7 explained above.

Rollers 12 are rotatably supported in the arm plate sections 11. The rollers 12 are disposed on the upper surface of the bottom plate section 3 of the lower rail 1. The rollers 12 support the upper rail 2 to be capable of sliding in a direction along the x axis (i.e., the front-back direction of the vehicle). As shown in FIGS. 1A and 1B, two rollers 12, 12 are arrayed in the x direction in the arm plate section 11 on the +y direction side. On the other hand, one roller 12 is disposed in the center position in the x direction in the arm plate section 11 on the −y direction side.

The seat slide device 100 includes a lock mechanism 13 that switches a lock state (FIG. 2A) in which movement of the upper rail 2 along the x axis is restricted and an unlock state (FIG. 2B) in which the movement of the upper rail 2 along the x axis is allowed. The lock mechanism 13 includes a lock member 14. The lock member 14 is formed from a bent metal plate. The lock member 14 is attached to, via a bracket 15, the metal plate 9 disposed on the +y direction side of the pair of metal plates 9, 9. The bracket 15 rotatably supports the lock member 14 with a rotating shaft 16 provided in parallel to the x axis.

The lock member 14 includes claw sections 14a and an operation section 14b. A plurality of claw sections 14a are formed at an end portion of the lock member 14. The respective claw sections 14a are formed in a strip shape and arrayed side by side in one row along the x axis. The width (the dimension in the x direction) of the respective claw sections 14a is set to width for allowing the claw sections 14a to be inserted through the openings 10a, the openings 7, and the openings 11a. Further, a disposition interval of the claw sections 14a is equal to a disposition interval of the openings 10a and the like. As shown in FIG. 2A, the lock state is a state in which the respective claw sections 14a pierce through the openings 10a, the openings 7, and the openings 11a. Consequently, the sliding (i.e., the movement along the x axis) of the upper rail 2 with respect to the lower rail 1 is restricted.

The operation section 14b is a portion formed at an end portion on the opposite side of the claw sections 14a across the rotating shaft 16 in the lock member 14. A handle 17, which is a portion operated by the occupant, is coupled to the operation section 14b. When the occupant pushes down the handle 17 from the lock state shown in FIG. 2A, the lock member 14 rotates around the rotating shaft 16. The seat slide device 100 shifts to a state in which the respective claw sections 14a are pulled out from the openings 10a, the openings 7, and the openings 11a, that is, the unlock state shown in FIG. 2B. In the unlock state, the restriction of the sliding of the upper rail 2 with respect to the lower rail 1 is released. The upper rail 2 can move along the x axis.

As shown in FIGS. 1A and 1B, one end of a coil spring 18 is connected to the vicinity of the operation section 14b in the lock member 14. The other end of the coil spring 18 is connected to the vicinity of the end portion on the +z direction side of the upper rail 2. The operation section 14b is urged to the +z direction side by an elastic restoration force of the coil spring 18. Therefore, when the occupant is not performing the operation of the handle 17, a state in which the respective claw sections 14a pierce through the openings 10a, the openings 7, and the openings 11a, that is, the lock state shown in FIG. 2A is maintained.

Figure 3:
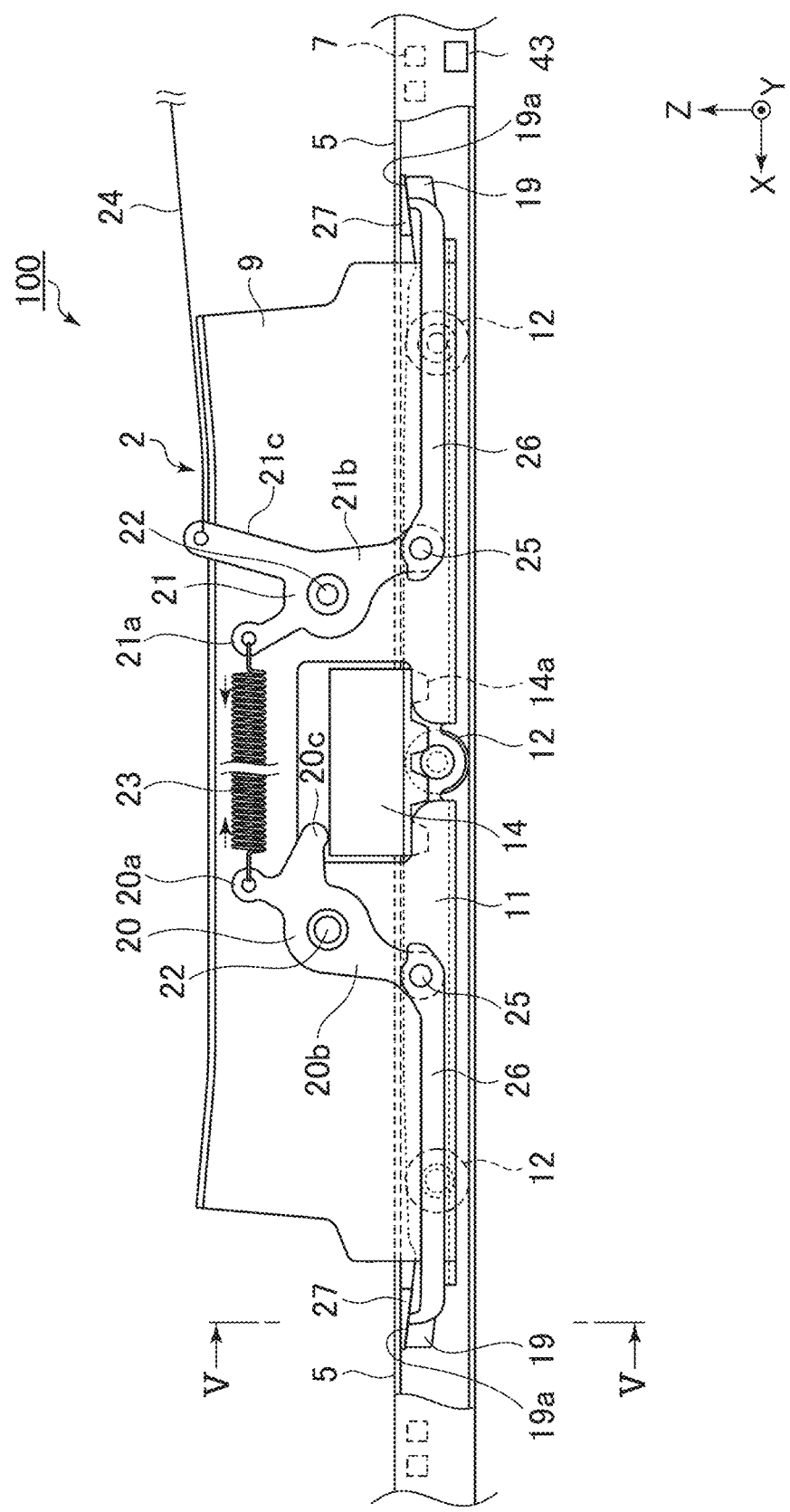
FIG. 3 is a diagram schematically showing the internal structure of the seat slide device according to the first embodiment of the present invention.
Figure 4:
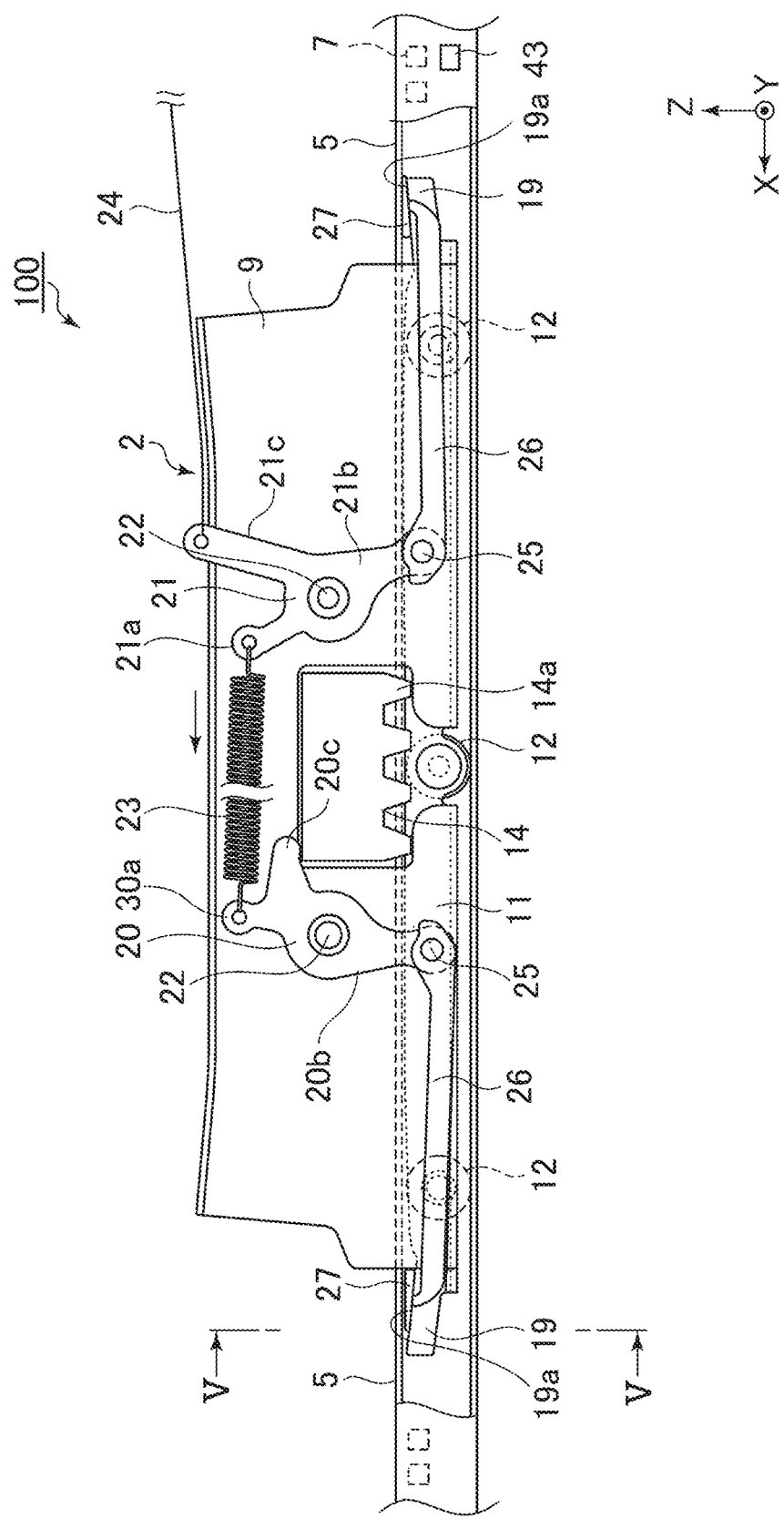
FIG. 4 is a diagram schematically showing the internal structure of the seat slide device according to the first embodiment of the present invention.

FIGS. 3 and 4 are diagrams schematically showing the internal structure of the seat slide device 100. In FIGS. 3 and 4, a state is shown in which a part of the metal plate 9 disposed on the +y direction side of the pair of metal plates 9, 9 and a part of the +y direction side (the side plate section 4, the upper plate section 5, and the dead plate section 6) in the lower rail 1 are respectively cut out. The lock state is shown in FIG. 3. The unlock state is shown in FIG. 4.

Referring to FIGS. 3 and 4 together, in the seat slide device 100, a first lever 20 and a second lever 21 are provided in positions on both sides of the lock member 14 along the x axis. The first lever 20 and the second lever 21 are generally flat members. The first lever 20 and the second lever 21 are attached to the metal plates 9, 9 via rotating shafts 22 in a state in which a normal direction of the first lever 20 and the second lever 21 are set along the y axis. The rotating shafts 22 are shafts parallel to the y axis. The first lever 20 and the second lever 21 are respectively attached to the metal plates 9, 9 in a state in which the first lever 20 and the second lever 21 are capable of rotating around the rotating shafts 22. As shown in FIGS. 2A and 2B, the first lever 20 and the second lever 21 are housed between the pair of metal plates 9, 9.

The first lever 20 provided further on the +x direction side than the lock member 14 includes an upper arm section 20a extending generally upward from the rotating shaft 22 and a lower arm section 20b extending generally downward from the rotating shaft 22 in a direction opposite to the upper arm section 20a across the rotating shaft 22. In the upper arm section 20a, a transmission section 20c projecting from the upper arm section 20a toward above the lock member 14 is integrally formed. As it is evident from FIGS. 3 and 4, the transmission section 20c has a function of engaging with the lock member 14 and transmitting a swing of the lock member 14 around the rotating shaft 16 as a swing of the first lever 20 around the rotating shaft 22.

The second lever 21 provided further on the −x direction side than the lock member 14 includes an upper arm section 21a extending generally upward from the rotating shaft 22 and a lower arm section 21b extending generally downward from the rotating shaft 22. The distal end of the upper arm section 20a of the first lever 20 and the distal end of the upper arm section 21a of the second lever 21 are connected to each other by a coil spring 23. The upper arm section 20a and the upper arm section 21a are urged by an elastic restoration force of the coil spring 23 in directions in which the upper arm section 20a and the upper arm section 21a approach each other. As a result, the transmission section 20c of the first lever 20 is always urged toward the lock member 14 around the rotating shaft 22.

As it is evident from FIG. 3, a section corresponding to the transmission section 20c of the first lever 20 is not formed in the upper arm section 21a of the second lever 21. Therefore, the swing of the lock member 14 is not transmitted to the second lever 21. Instead, a transmission section 21c extending from the rotating shaft 22 in an upward direction different from an upward direction in which the upper arm section 21a extends is formed in the second lever 21. One end of a wire 24 is connected to the distal end of the transmission section 21c. The other end of the wire 24 is connected to the seatback and is pulled in the −x direction side in association with a motion of the seatback taking the folded posture.

One ends of sliders 26 are respectively connected to the lower arm section 20b of the first lever 20 and the lower arm section 21b of the second lever 21 to be capable of swinging around supporting shafts 25. The sliders 26 are bar-like members disposed in a state in which the longitudinal directions of the sliders 26 generally set along the x axis. The slider 26 connected to the first lever 20 extends in the +x direction from the lower end of the lower arm section 20b. On the other hand, the slider 26 connected to the second lever 21 extends in the −x direction from the lower end of the lower arm section 21b. Contact sections 27 are integrally formed in positions at end portions on the opposite sides of the supporting shafts 25 in the sliders 26. The sliders 26 and the contact sections 27 are integrally molded from, for example, a resin material.

When the operation section 14b of the lock member 14 is pushed down in the −z direction side and the unlock state is established, as shown in FIG. 4, the lock member 14 comes into contact with the transmission section 20c. The transmission section 20c is lifted together with the lock member 14. Consequently, the upper arm section 20a of the first lever 20 moves in a direction away from the upper arm section 21a of the second lever 21 while resisting the elastic restoration force of the coil spring 23. As a result, the first lever 20 swings counterclockwise around the rotating shaft 22. Consequently, the slider 26 on the first lever 20 side moves toward the lock member 14 side (the −x direction side). Note that details of subsequent motions are explained below.

FIG. 5A is an enlarged sectional view taken along line V-V in FIG. 3. FIG. 5B is an enlarged sectional view taken along line V-V in FIG. 4. Referring to FIGS. 5A and 5B together, the contact section 27 includes an intermediate section 27a and a pair of arm sections 27b, 27b supported by the intermediate section 27a at distal ends of the intermediate section 27a and provided in the +y direction side and the −y direction side. In the arm sections 27b, through-holes 28, which have rectangular cross sections, piercing through the arm sections 27b generally along the x axis are formed. Guide sections 19 formed at end portions of the arm plate sections 11 are inserted through the through-holes 28.

As it is evident from FIGS. 3 and 4, the longitudinal direction of the guide sections 19 is inclined with respect to the x axis such that the guide sections 19 are closer to the upper plate section 5 toward the distal end sides of the guide sections 19. That is, the guide section 19 of the slider 26 disposed on the +x direction side is inclined to be closer to the upper plate section 5 toward the +x direction side. The guide section 19 of the slider 26 disposed on the −x direction side is inclined to be closer to the upper plate section 5 toward the −x direction side.

Since the guide sections 19 are inclined as explained above, end faces on the +z direction side of the guide sections 19 form inclined surfaces 19a formed in parts of the upper rail 2. The inclined surfaces 19a are surfaces inclined with respect to the horizontal plane further toward the +z direction side as the surfaces are further apart from the lock member 14. Inner wall surfaces of the through-holes 28 are generally parallel to the surfaces of the guide sections 19 opposed to the inner wall surfaces. Therefore, the inner wall surfaces, that is, top surfaces of the through-holes 28 on the +z direction side form surfaces inclined like the inclined surfaces 19a. The same applies to the inner wall surfaces (i.e., bottom surfaces) of the through-holes 28 in the −z direction side.

The operation of the seat slide device 100 is explained. First, a scene is assumed in which the seatback of the seat takes the normal posture in which the seatback is not folded with respect to the seat cushion. The lock state is established in the lock mechanism 13 of the seat slide device 100. The occupant may sit on the seat or may not sit on the seat. In the lock state, as shown in FIG. 2A, the respective claw sections 14a are in a state in which the claw sections 14a pierce through the openings 10a, the openings 7, and the openings 11a. The sliding of the upper rail 2 with respect to the lower rail 1 is restricted.

At this point, as shown in FIG. 3, the upper arm section 20a of the first lever 20 and the upper arm section 21a of the second lever 21 are urged by the elastic restoration force of the coil spring 23 in the directions in which the upper arm section 20a and the upper arm section 21a approach each other along the x axis. The seat takes the normal posture. An operation lever of the seat for taking the folded posture of the seatback is not operated. Therefore, the seatback is not folded with respect to the seat cushion. No force acts on the transmission section 21c from the wire 24.

As shown in FIG. 3, the upper arm section 20a and the upper arm section 21a are urged by the elastic restoration force of the coil spring 23 in the directions in which the upper arm section 20a and the upper arm section 21a approach each other along the x axis. Consequently, the sliders 26, 26 are pushed out in directions in which the sliders 26, 26 move away from each other along the x axis. In this way, as shown in FIG. 5A, the contact sections 27 of the sliders 26 are maintained in a state in which the contact sections 27 are held between the inclined surfaces 19a and the lower surfaces (contact surfaces) of the upper plate sections 5 like wedges. As a result, a force along the z direction and a frictional force along the x direction work between the contact sections 27 and the upper plate section 5. Consequently, backlash (relative displacement along the z axis) between the lower rail 1 and the upper rail 2 is suppressed.

Note that, in FIGS. 3 and 4, only wedge-like portions held between the inclined surfaces 19a and the upper plate section 5 in the contact sections 27 are schematically shown. The same applies in FIGS. 6 to 12 and FIGS. 16 to 18 referred to below.

A sitting time when the occupant sits on the seat is explained (the first condition). Specifically, a state in which one of the seatback of the seat and the seat cushion of the seat is not folded with respect to the other is explained. The "state in which one of the seatback of the seat and the seat cushion of the seat is not folded with respect to the other" means a state in which an angle of the seatback or the like is an angle during traveling (an angle at which the occupant can sit).

When the lock state is established in the lock mechanism 13, explanation is the same as the above explanation. Therefore, redundant explanation is omitted. When the unlock state is established in the lock mechanism 13 when the occupant operates the handle 17, as shown in FIG. 2B, the respective claw sections 14a are pulled out from the openings 10a, the openings 7, and the openings 11a. The restriction of the sliding of the upper rail 2 with respect to the lower rail 1 is released. In this way, the sliding of the upper rail 2 along the x axis is allowed.

At this point, as shown in FIG. 4, when the lock member 14 lifts the transmission section 20c according to the operation of the handle 17, the upper arm section 20a of the first lever 20 moves in a direction away from the second lever 21 while resisting the elastic restoration force of the coil spring 23. As a result, the first lever 20 swings counterclockwise around the rotating shaft 22. Consequently, the slider 26 on the first lever 20 side moves toward the lock member 14 side (the −x direction side). According to the movement of the slider 26, the contact section 27 disposed on the +x direction side separates from the lower surface of the upper plate section 5. Consequently, as shown in FIGS. 4 and 5B, a gap is formed between the contact section 27 and the lower surface of the upper plate section 5.

On the other hand, the second lever 21 is not directly associated with the lock member 14. However, the second lever 21 rotates around the rotating shaft 22 with a force from the coil spring 23. Specifically, the upper arm section 21a of the second lever 21 is urged toward the lock member 14 side to rotate counterclockwise around the rotating shaft 22 according to the movement of the upper arm section 20*a* of the first lever 20 in the direction away from the second lever 21. Note that, since the occupant sits on the seat, as explained above, the seat takes the normal posture. No force acts on the transmission section 21*c* from the wire 24.

In this way, the upper arm section 21*a* of the second lever 21 is urged toward the lock member 14 side to rotate counterclockwise around the rotating shaft 22. Therefore, the slider 26 on the second lever 21 side is pushed out in the rearward direction of the vehicle (to the −x direction side) along the x axis. In this way, in the same manner as when the lock state is established, the contact section 27 of the slider 26 on the second lever 21 side is maintained in a state in which the contact section 27 is held between the inclined surface 19*a* and the lower surface (the contact surface) of the upper plate section 5 like a wedge. As a result, a force along the z direction and a frictional force along the x direction work between the contact section 27 and the upper plate section 5.

In the state explained above, a scene is assumed in which the occupant slides the seat in the forward direction of the vehicle (in a first direction), that is, moves the upper rail 2 in the forward direction of the vehicle with respect to the lower rail 1. As it is evident from FIG. 4, the inclined surface 19*a* of the guide section 19 on the rearward side of the vehicle is inclined further toward the +z direction side toward the rearward direction of the vehicle. Therefore, when the upper rail 2 (i.e., the guide section 19) moves in the forward direction of the vehicle, the contact section 27 of the slider 26 on the rearward side of the vehicle is about to further enter between the inclined surface 19*a* and the lower surface of the upper plate section 5 with the frictional force. As a result, the frictional force, that is, sliding resistance increases. At this point, since there is the gap between the contact section 27 of the slider 26 on the forward side of the vehicle and the lower surface of the upper plate section 5, the sliding resistance is 0 (zero). The sliding resistance of the upper rail 2 in this case is equivalent to the first sliding resistance.

On the other hand, a scene is assumed in which the occupant slides the seat in the rearward direction of the vehicle (a second direction opposite to the first direction), that is, moves the upper rail 2 in the rearward direction of the vehicle with respect to the lower rail 1. As it is evident from FIG. 4, the inclined surface 19*a* of the guide section 19 on the rearward side of the vehicle is inclined further toward the −z direction side toward the forward direction of the vehicle. Therefore, when the upper rail 2 (i.e., the guide section 19) moves in the rearward direction of the vehicle, the contact section 27 of the slider 26 on the rearward side of the vehicle is about to withdraw from between the inclined surface 19*a* and the lower surface of the upper plate section 5 with the frictional force. As a result, the frictional force, that is, the sliding resistance decreases. At this point, since there is the gap between the contact section 27 of the slider 26 on the forward side of the vehicle and the lower surface of the upper plate section 5, the sliding resistance is 0 (zero). The sliding resistance of the upper rail 2 in this case is equivalent to the second sliding resistance. Since the sliding resistance of the contact section 27 on the rearward side of the vehicle decreases compared with the sliding resistance during the sliding to the forward side, the second sliding resistance is smaller than the first sliding resistance.

According to the above explanation, in a scene in which the unlock state is established in the lock mechanism 13 of the seat slide device 100 when the occupant sits on the seat (at a sitting time), the sliding resistance increases when the upper rail 2 is moved in the forward direction of the vehicle (the first sliding resistance) and, on the other hand, the sliding resistance decreases when the upper rail 2 is moved in the rearward direction of the vehicle (the second sliding resistance). In general, the seat slide device 100 is disposed to slightly incline forward to be closer to the ground toward the forward direction of the vehicle. Therefore, with the seat slide device 100 in this embodiment, it is possible to suppress sudden movement of the seat when the seat moves forward. The occupant can comfortably move the seat without feeling a fear.

A time when the occupant does not sit on the seat (a non-sitting time) is explained (the second condition). Specifically, a state in which one of the seatback of the seat and the seat cushion of the seat is folded with respect to the other is explained. The "state in which one of the seatback of the seat and the seat cushion of the seat is folded with respect to the other" means a state in which an angle of a seatback or the like of the seat on the forward side (e.g., a second seat) is changed to an angle different from the angle during the traveling such that the occupant can get on the seat on the rearward side (e.g., a third seat).

Figure 6:
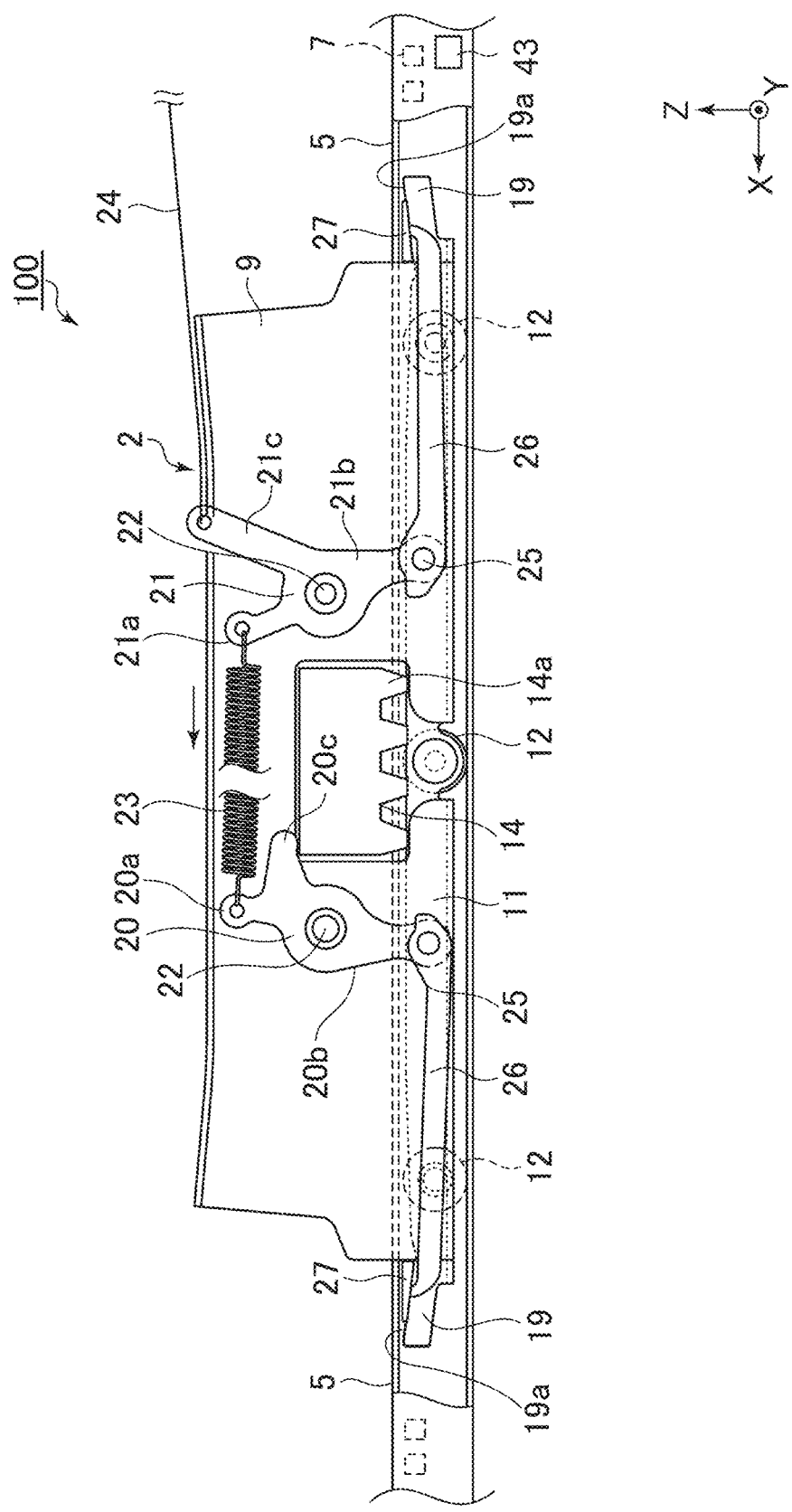
FIG. 6 is a diagram schematically showing the internal structure of the seat slide device according to the first embodiment of the present invention.

When the lock state is established in the lock mechanism 13, explanation is the same as the above explanation. Therefore, redundant explanation is omitted. A scene is assumed in which the occupant sets the seatback in the folded posture by operating the operation lever of the seat. The wire 24 is pulled in the rearward direction of the vehicle in association with a folding motion of the seatback. As a result, the transmission section 21*c* of the second lever 21 is pulled in a direction away from the lock member 14 while resisting the elastic restoration force of the coil spring 23. In this way, the second lever 21 swings clockwise around the rotating shaft 22. The slider 26 on the second lever 21 side moves toward the lock member 14 side. As a result, as shown in FIG. 6, a gap is formed between the contact section 27 of the slider 26 on the second lever 21 side and the lower surface of the upper plate section 5.

At this point, when the unlock state is established in the lock mechanism 13, the lock member 14 lifts the transmission section 20*c* according to the operation of the handle 17, whereby the upper arm section 20*a* of the first lever 20 moves in the direction away from the second lever 21 while resisting the elastic restoration force of the coil spring 23. The first lever 20 swings counterclockwise around the rotating shaft 22. The slider 26 on the first lever 20 side moves toward the lock member 14 side. According to the movement of the slider 26, the contact section 27 of the slider 26 on the first lever 20 side separates from the lower surface of the upper plate section 5. Consequently, a gap is formed between the contact section 27 and the lower surface of the upper plate section 5. In this case, the sliding resistance of the upper rail 2 at the time when the seat is slid in the forward direction of the vehicle is the third sliding resistance. The sliding resistance of the upper rail 2 at the time when the seat is slid in the rearward direction of the vehicle is the fourth sliding resistance. Since both the contact sections 27 on the forward side and the rearward side of the vehicle are separated from the lower surface of the upper plate section 5, the third sliding resistance and the fourth sliding resistance are smaller than the second sliding resistance.

According to the above explanation, the frictional force is 0 between the contact sections 27 on the forward side and the rearward side of the vehicle and the lower surface of the upper plate section 5. Therefore, the sliding resistance of the upper rail 2 with respect to the lower rail 1, specifically, the third sliding resistance and the fourth sliding resistance can be set extremely small. As a result, the occupant can easily and comfortably move the seat with a light force forward and in the rearward direction of the vehicle. As explained above, in general, the seat slide device 100 is disposed to slightly incline to be closer to the ground toward the forward direction of the vehicle. Therefore, for example, when moving the seat forward, the occupant can move the seat in the forward direction of the vehicle only with the own weight of the seat even if the occupant does not apply a force to the seat. Therefore, according to the present invention, when the lock mechanism 13 is in the unlock state and at the sitting time and at the non-sitting time, it is possible to dynamically adjust the sliding resistance of the upper rail 2 and switch setting of the sliding resistance.

The respective contact sections 27 disposed on the forward side and the rearward side of the vehicle can be considered members retained by the upper rail 2 and members held between the lower rail 1 (the upper plate section 5) and the upper rail 2 (the guide section 19) in order to increase the sliding resistance.

The first lever 20, the second lever 21, the slider 26, and the contact section 27 configure a mechanism for adjusting the sliding resistance of the sliding of the upper rail 2 with respect to the lower rail 1 in the unlock state, that is, an "adjusting mechanism" in this embodiment.

Figure 7:
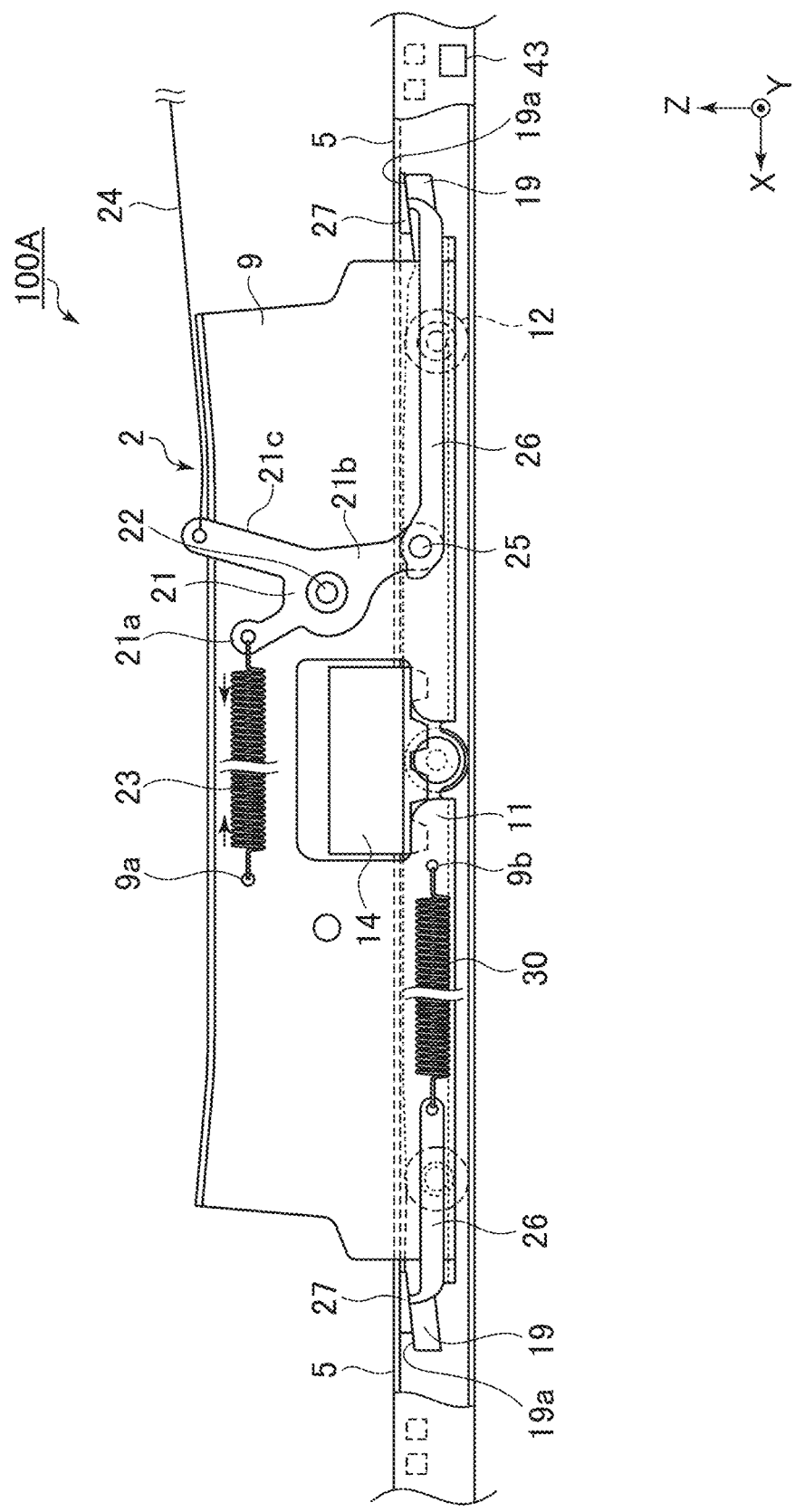
FIG. 7 is a diagram schematically showing the internal structure of a seat slide device according to a second embodiment of the present invention.

FIG. 7 is a diagram schematically showing the internal structure of a seat slide device 100A according to a second embodiment of the present invention. FIG. 7 shows a state in which the lock state is established in the lock mechanism 13. In the following explanation, only differences from the first embodiment are explained. Explanation is omitted as appropriate concerning similarities to the first embodiment.

In the seat slide device 100A according to the second embodiment, the integration of the first lever 20 in the first embodiment is omitted. That is, nothing is associated with the motion of the lock member 14. As it is evident from FIG. 7, one end of the coil spring 23 is locked to a locking hole 9a formed in the metal plate 9. The other end of the coil spring 23 is connected to the upper arm section 21a of the second lever 21. Therefore, as explained above, the upper arm section 21a is urged to the lock member 14 side by the elastic restoration force of the coil spring 23 to rotate counterclockwise around the rotating shaft 22. Therefore, the contact section 27 of the slider 26 on the rearward side of the vehicle is urged to the −x direction side and maintained in a state in which the contact section 27 is held between the inclined surface 19a and the lower surface of the upper plate section 5 like a wedge.

On the other hand, one end of the slider 26 on the forward side of the vehicle is connected to one end of a coil spring 30 extending along the x axis. The other end of the coil spring 30 is locked to a locking hole 9b formed in the metal plate 9. The contact section 27 is integrally formed at the other end (the end portion on the +x direction side) of the slider 26. The slider 26 on the rearward side is urged to the −x direction side by an elastic restoration force of the coil spring 30.

In this embodiment, the contact section 27 and the inclined surface 19a of the guide section 19 on the forward side of the vehicle are configured the same as the contact section 27 and the inclined surface 19a of the guide section 19 on the rearward side of the vehicle. That is, the inclined surface 19a of the guide section 19 on the forward side of the vehicle is inclined further toward the −z direction side toward the forward direction of the vehicle. Therefore, the contact section 27 of the slider 26 on the forward side of the vehicle is urged to the −x direction side by the elastic restoration force of the coil spring 30 and maintained in a state in which the contact section 27 is held between the inclined surface 19a and the lower surface of the upper plate section 5 like a wedge.

With the seat slide device 100A configured as explained above, it is possible to realize actions and effects the same as the actions and effects of the seat slide device 100 in the first embodiment. That is, irrespective of the lock state and the unlock state, the slider 26 on the rearward side of the vehicle is pushed out in the rearward direction of the vehicle by the elastic restoration force of the coil spring 23. Therefore, the contact section of the slider 26 is maintained in the state in which the contact section 27 is held between the inclined surface 19a and the lower surface of the upper plate section 5 like a wedge. Similarly, the slider 26 on the forward side of the vehicle is pulled in the rearward direction of the vehicle by the elastic restoration force of the coil spring 30. Therefore, the contact section 27 of the slider 26 is maintained in the state in which the contact section 27 is held between the inclined surface 19a and the lower surface of the upper plate section 5 like a wedge.

A scene is assumed in which the unlock state is established in the lock mechanism 13 at the sitting time of the occupant (the first condition). As explained above, in this embodiment, both the inclined surfaces 19a, 19a on the forward side and the rearward side of the vehicle are inclined further toward the +z direction side toward the rearward direction of the vehicle. Therefore, when the seat, that is, the upper rail 2 is about to move in the forward direction of the vehicle, both the contact sections 27, 27 on the forward side and the rearward side of the vehicle are about to further enter between the inclined surface 19a and the lower surface of the upper plate section 5 with a frictional force received from the upper plate section 5. As a result, a frictional force, that is, sliding resistance (the first sliding resistance in this embodiment) received by the upper rail 2 increases.

On the other hand, in a scene in which the occupant moves the upper rail 2 in the rearward direction of the vehicle with respect to the lower rail 1, when the seat, that is, the upper rail 2 moves in the rearward direction of the vehicle, both the contact sections 27, 27 on the forward side and the rearward side of the vehicle are about to withdraw from between the inclined surface 19a and the lower surface of the upper plate section 5 with the frictional force received from the upper plate section 5. As a result, the frictional force, that is, the sliding resistance (the second sliding resistance in this embodiment) decreases.

As in the above explanation, when the seatback is in the folded posture (the second condition), the wire 24 is pulled in the rearward direction of the vehicle in association with a folding motion of the seatback. As a result, the transmission section 21c of the second lever 21 is pulled in a direction away from the lock member 14 while resisting the elastic restoration force of the coil spring 23. The second lever 21 swings clockwise around the rotating shaft 22. The slider 26 on the second lever 21 side moves toward the lock member 14 side.

Consequently, a gap is formed between the contact section 27 of the slider 26 on the rearward side of the vehicle and the lower surface of the upper plate section 5. The sliding resistance between the contact section 27 on the rearward side of the vehicle and the lower surface of the upper plate section 5 is 0 irrespective of a moving direction of the seat. On the other hand, the sliding resistance between the contact section 27 on the forward side of the vehicle and the lower surface of the upper plate section 5 has different magnitude according to the moving direction as in the case of the sitting time of the occupant explained above. That is, the sliding resistance in moving the seat to the forward side is larger than the sliding resistance in moving the seat to the rearward side.

As explained above, in this embodiment, only the sliding resistance between the contact section 27 on the rearward side of the vehicle and the lower surface of the upper plate section 5 is changed in association with the folding motion of the seatback. When seatback is in the folded posture, the sliding resistance received by the upper rail 2 in moving the seat to the forward side corresponds to the third sliding resistance in this embodiment and the sliding resistance received by the upper rail 2 in moving the seat to the rearward side corresponds to the fourth sliding resistance in this embodiment. The fourth sliding resistance is smaller than all of the first sliding resistance, the second sliding resistance, and the third sliding resistance.

In this embodiment, as in the first embodiment, the respective contact sections 27 disposed on the forward side and the rearward side of the vehicle can be considered members retained by the upper rail 2 and members held between the lower rail 1 (the upper plate section 5) and the upper rail 2 (the guide section 19) in order to increase the sliding resistance. The contact section 27 disposed on the forward side corresponds to a "first wedge member" in this embodiment. The contact section 27 disposed in a position further on the rearward side than the first wedge member corresponds to a "second wedge member" in this embodiment.

The respective sliders 26 disposed on the forward side and the rearward side of the vehicle can be considered members that move the contact sections 27 in the same predetermined direction (specifically, the −x direction) and increase a frictional force working between the contact sections 27 and the lower rail 1 to thereby increase the sliding resistance. The slider 26 disposed on the forward side corresponds to a "first supporting member" for moving the first wedge member in the −x direction and increasing a frictional force working between the first wedge member and the lower rail 1 (the upper plate section 5) to thereby increase the sliding resistance. The slider 26 disposed in a position further on the rearward side than the first supporting member corresponds to a "second supporting member" for moving the second wedge member in the −x direction and increasing a frictional force working between the second wedge member and the lower rail 1 (the upper plate section 5) to thereby increase the sliding resistance.

In the seat slide device 100A explained above, as shown in FIG. 8, a coupling member 31 that couples the slider 26 on the forward side of the vehicle and the slider 26 on the rearward side of the vehicle may be further integrated. The end portion on the −x direction side of the coupling member 31 is rotatably coupled to the lower end portion of the lower arm section 21b together with the slider 26 on the rearward side of the vehicle. The end portion on the +x direction side of the coupling member 31 is coupled to the slider 26 on the forward side of the vehicle.

Therefore, when the wire 24 is pulled in the backward direction of the vehicle in association with the folding motion of the seatback, the slider 26 on the forward side of the vehicle is pushed out in the forward direction of the vehicle by the coupling member 31. As a result, a gap is formed between the contact section 27 on the forward side of the vehicle and the lower surface of the upper plate section 5. Consequently, on the forward side of the vehicle, as on the rearward side of the vehicle, the frictional force between the contact section 27 and the lower surface of the upper plate section 5 is 0. Therefore, the sliding resistance of the upper rail 2 with respect to the lower rail 1 in moving the seat in the forward direction of the vehicle can be set smaller.

Figure 9:
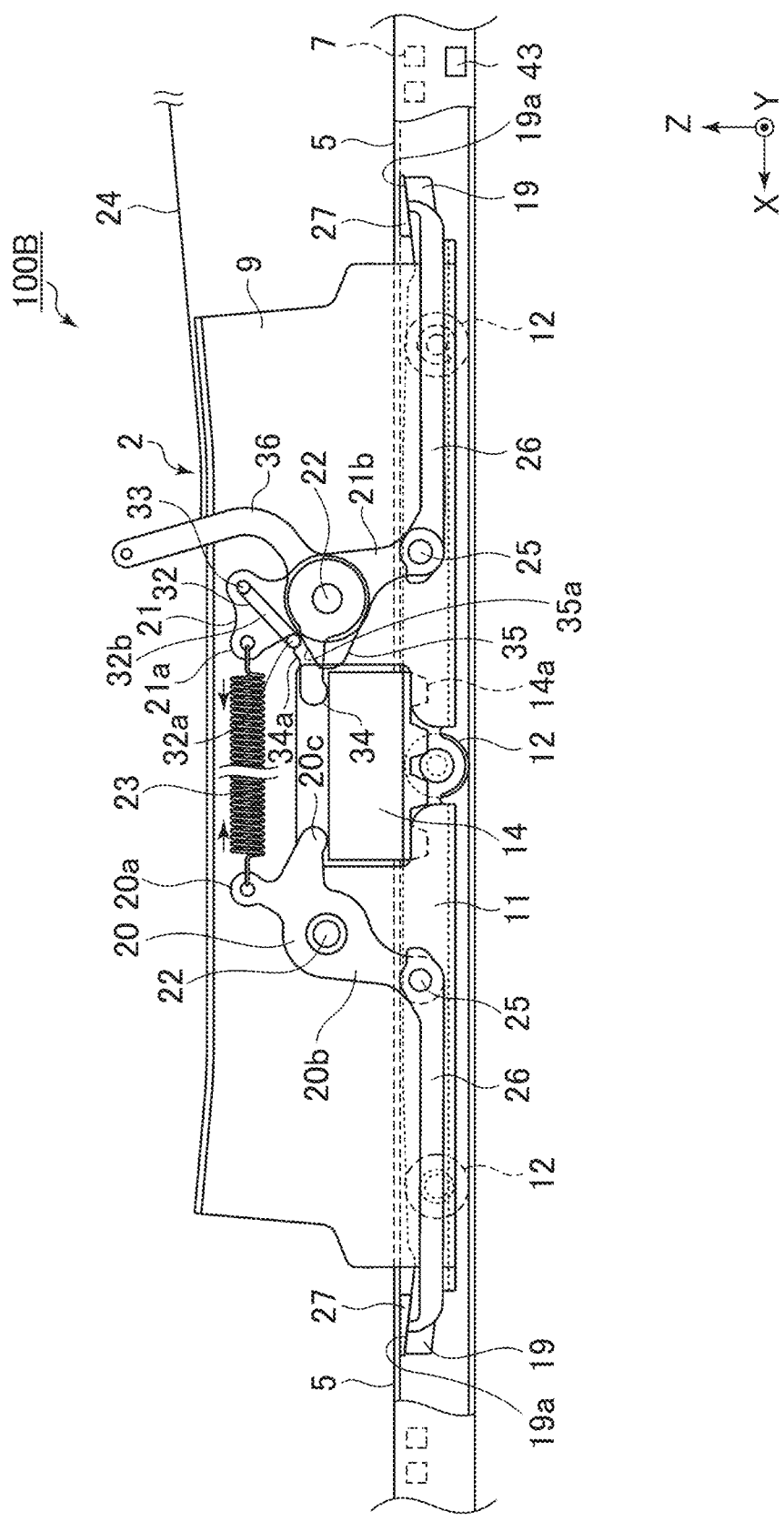
FIG. 9 is a diagram schematically showing the internal structure of a seat slide device according to a third embodiment of the present invention.

FIG. 9 is a diagram schematically showing the internal structure of a seat slide device 100B according to a third embodiment of the present invention. FIG. 9 shows a state in which the lock state is established in the lock mechanism 13. In the following explanation, only differences from the first embodiment and the second embodiment are explained. Explanation is omitted as appropriate concerning similarities to the first embodiment and the second embodiment.

In the seat slide device 100B according to the third embodiment, the configuration of the second lever 21 is changed in the seat slide device 100 in the first embodiment. Specifically, a swinging member 32, which is a bar-like member, is coupled to the upper arm section 21a of the second lever 21 to be capable of swinging around a swinging shaft 33 specified in parallel to the y axis. The swinging member 32 includes the swinging shaft 33, a linear section 32b, and a shaft portion 32a. The linear section 32b is a linear portion extending from the swinging shaft 33 in a direction perpendicular to the y axis. The shaft portion 32a is a linear portion extending from the end portion on the opposite side of the swinging shaft 33 in the linear section 32b toward a paper surface depth direction (i.e., the −y direction) in FIG. 9. The shaft portion 32a is disposed along the side surface on the lock member 14 side in the upper arm section 21a of the second lever 21.

The swinging shaft 33 in this embodiment is a linear portion extending from the end portion on the opposite side of the shaft portion 32a in the linear section 32b toward the paper surface depth direction (i.e., the −y direction) in FIG. 9. The swinging shaft 33 is inserted through, for example, a hole formed in the upper arm section 21a. The swinging member 32 is supported in a state in which the swinging member 32 is capable of rotating around the swinging shaft 33 with respect to the second lever 21.

A transmission member 34 rotatably supported by the rotating shaft 22 is associated with the swinging member 32. Like the transmission section 20c of the first lever 20, the transmission member 34 has a function of engaging with the lock member 14 and transmitting a swing of the lock member 14 as a swing of the second lever 21. A projecting section 34a projecting in the +z direction is formed on the side surface on the upper side in the +z direction of the transmission member 34. With the projecting section 34a set as a boundary, a first region is specified on the side surface on the proximal end side (i.e., the rotating shaft 22 side) of the transmission member 34 and a second region is specified on the side surface on the distal end side of the transmission member 34. In FIG. 9, the shaft portion 32a of the swinging member 32 is disposed in the first region.

A cam member 35 rotatably supported by the rotating shaft 22 is further associated with the swinging member 32. A cam surface 35a is formed on the side surface on the upper side in the +z direction of the cam member 35. The shaft portion 32a of the swinging member 32 is associated with the cam surface 35a. Consequently, according to the swing of the cam member 35 around the rotating shaft 22, the shaft portion 32a of the swinging member 32 can change the position of the shaft portion 32a from the first region to the second region of the transmission member 34. Note that a lever 36 extending upward is integrated with the cam member 35. For example, occupant can swing the cam member 35 by manually operating the lever 36.

The operation of the seat slide device 100B is explained. In a scene in which the lock state is established in the lock mechanism 13, the upper arm section 20a of the first lever 20 and the upper arm section 21a of the second lever 21 are urged by the elastic restoration force of the coil spring 23 in directions in which the upper arm section 20a and the upper arm section 21a approach each other along the x axis. As a result, the sliders 26, 26 are pushed out in directions in which the sliders 26, 26 move away from each other along the x axis. In this way, the respective contact sections 27 are held between the inclined surface 19a and the lower surface (the contact surface) of the upper plate section 5 like wedges. As a result, a force along the z direction and a frictional force along the x direction work between the contact sections 27 and the upper plate section 5.

Figure 10:
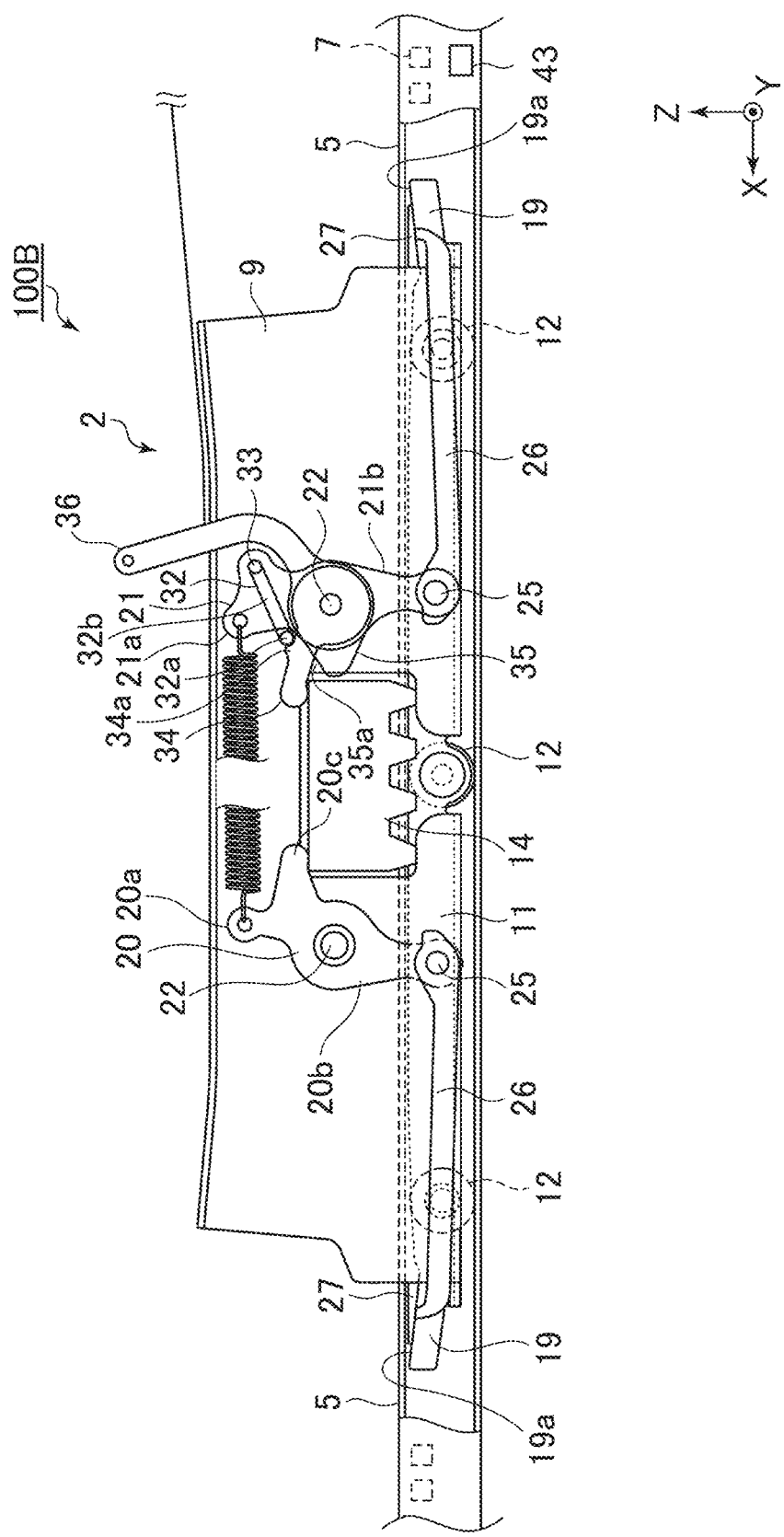
FIG. 10 is a diagram schematically showing the internal structure of the seat slide device according to the third embodiment of the present invention.

Subsequently, when the unlock state is established in the lock mechanism 13, as shown in FIG. 10, the lock member 14 lifts the transmission section 20c and the transmission member 34. The upper arm section 20a of the first lever 20 swings in a direction in which the upper arm section 20a separates from the second lever 21 while resisting the elastic restoration force of the coil spring 23. On the other hand, the shaft portion 32a of the swinging member 32 locks to the projecting section 34a of the transmission member 34 and stays in the first region. Therefore, the projecting section 34a of the transmission member 34 swings the second lever 21 in a direction in which the second lever 21 separates from the first lever 20 (i.e., clockwise) while resisting the elastic restoration force of the coil spring 23. As a result, both the sliders 26 move to approach each other. Therefore, the respective contact sections 27 separate from the lower surface of the upper plate section 5. Gaps are formed between the contact sections 27 and the lower surface of the upper plate section 5. Therefore, both of the sliding resistance in sliding the seat to the forward side (the third sliding resistance) and the sliding resistance in sliding the seat to the rearward side (the fourth sliding resistance) decrease. Such a state is set when the occupant does not sit on the seat (the second condition).

Figure 11:
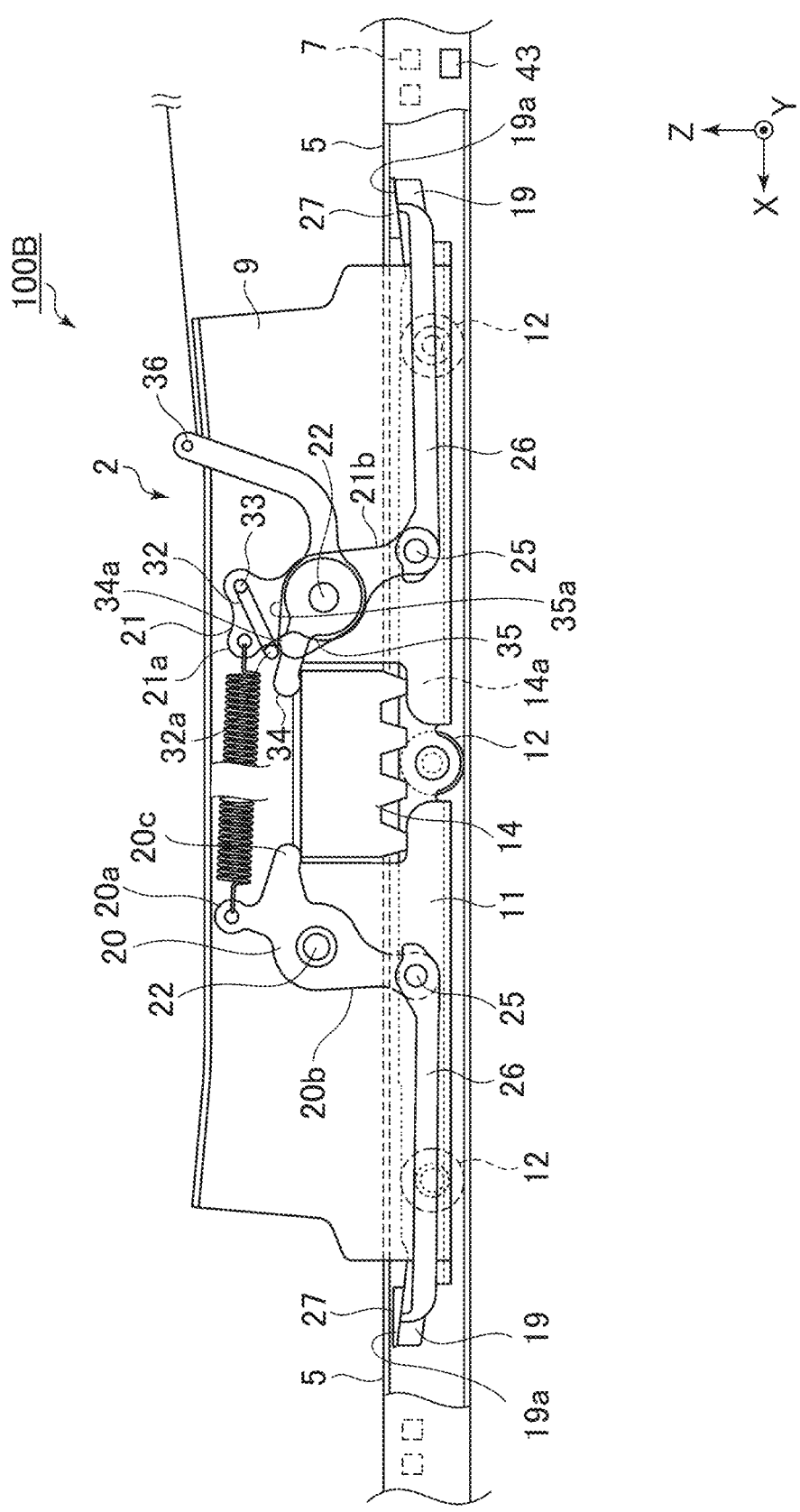
FIG. 11 is a diagram schematically showing the internal structure of the seat slide device according to the third embodiment of the present invention.

On the other hand, during the establishment of the unlock state, when the cam member 35 is swung clockwise in FIG. 10 by the operation of the lever 36, the cam surface 35a of the cam member 35 lifts the shaft portion 32a of the swinging member 32. When the cam member 35 further swings clockwise, the shaft portion 32a of the swinging member 32 is released from the locking to the projecting section 34a. As a result, the upper arm section 21a of the second lever 21 swings to the lock member 14 side with the elastic restoration force of the coil spring 23. Consequently, as shown in FIG. 11, the shaft portion 32a of the swinging member 32 moves from the first region to the second region.

As a result, the slider 26 on the rearward side of the vehicle is pushed out in a backward direction of the vehicle. In this way, the contact section 27 on the rearward side is held between the inclined surface 19a and the lower surface (the contact surface) of the upper plate section 5 like a wedge. As a result, a force along the z direction and a frictional force along the x direction work between the contact section 27 and the upper plate section 5. Therefore, as in the first embodiment, it is possible to increase the sliding resistance (the first sliding resistance) in moving the upper rail 2 in the forward direction of the vehicle (the first condition). In this way, the seat slide device 100B in this embodiment can realize actions and effects the same as the actions and effects in the embodiments explained above.

The lever 36 in this embodiment corresponds to a part of an "adjusting mechanism" for adjusting the sliding resistance of the sliding of the upper rail 2 with respect to the lower rail 1. As explained above, the adjusting mechanism is configured to change the sliding resistance on the basis of operation performed by the occupant on the lever 36.

In the first and second embodiments explained above, a sensor 43 that detects inclination of the seat slide devices 100 and 100A may be integrated in the seat slide devices 100 and 100A. The sliding resistance of the upper rail 2 may be dynamically adjusted according to the magnitude of the inclination detected by the sensor 43. For example, at the sitting time of the occupant, when the sensor 43 detects that the inclination of the seat slide devices 100 and 100A increases, the transmission section 21c may be swung counterclockwise by an electric actuator to cause the contact section 27 of the slider 26 on the rearward side of the vehicle to further enter between the inclined surface 19a and the lower surface of the upper plate section 5. With such a configuration, it is also possible to appropriately increase the sliding resistance of the upper rail 2.

For example, when the inclination of the seat slide devices 100 and 100A is excessively larger than a predetermined threshold at the non-sitting time of the occupant, control for increasing the sliding resistance of the upper rail 2 may be performed. For the control, it is assumed that, for example, a pulling amount of the wire 24 by the electric actuator or the like is reduced and the contact section 27 is held between the inclined surfaces 19a of the contact sections 27 and the lower (the contact) surface of the upper plate sections 5 like wedges.

For example, in the first and second embodiments, one end of the wire 24 is connected to the distal end of the transmission section 21c of the second lever 21. The wire 24 is pulled in association with the folding motion of the seatback. However, the other end of the wire 24 may be connected to, for example, the seat cushion. In this case, the wire 24 is pulled in association with, for example, a folding motion of the seat cushion being folded with respect to the seatback (i.e., a motion for flipping up the seat cushion with respect to the seatback). It is also possible to dynamically adjust the sliding resistance of the upper rail 2 through the association with the folding motion.

The other end of the wire 24 may be connected to, for example, an operation handle (not shown in the figure) operable by the occupant to enable, for example, the occupant not sitting on the seat to dynamically adjust a pulling amount of the wire 24, that is, the sliding resistance of the upper rail 2 by operating the operation handle. In this case, the seatback and the seat cushion are not folded with respect to each other. The seat takes the normal posture. In such a case, it is also possible to realize dynamic adjustment of the sliding resistance at the sitting time and the non-sitting time (the first condition and the second condition) through the operation by the occupant.

For example, in the seat slide device 100B according to the third embodiment, a sensor that detects sinking of the seat at the time when the occupant sits on the seat may be integrated. In this modification, it is also possible that, the lever 36 is operated by the electric actuator or the like according to the sitting of the occupant detected by the sensor, whereby the shaft portion 32a of the swinging member 32 moves from the first region to the second region of the transmission member 34 and the first sliding resistance is set in the seat slide device 100B. In this way, in the seat slide device 100B, the sitting time and the non-sitting time (the first condition and the second condition) may be automatically switched.

Incidentally, in the modification of the second embodiment explained with reference to FIG. 8, according to the rotation of the second lever 21, the contact sections 27 on the forward and rearward sides move in the directions in which the contact sections 27 separate from each other. At this point, if timing when the contact section 27 on the forward side is pressed against the upper plate section 5 and timing when the contact section 27 on the rearward side is pressed against the upper plate section 5 are the same, it is possible to change the sliding resistance in sliding the seat to magnitude as designed.

However, for example, when the timings are different from each other because of a dimension error of a component, at a stage when one contact section 27 is pressed against the upper plate section 5, the respective contact sections 27 cannot be further displaced. That is, whereas only the one contact section 27 is pressed against the upper plate section 5, the other contact section 27 is not pressed against the upper plate section 5. In such a state, the sliding resistance in sliding the seat is smaller than a design value.

Figure 12:
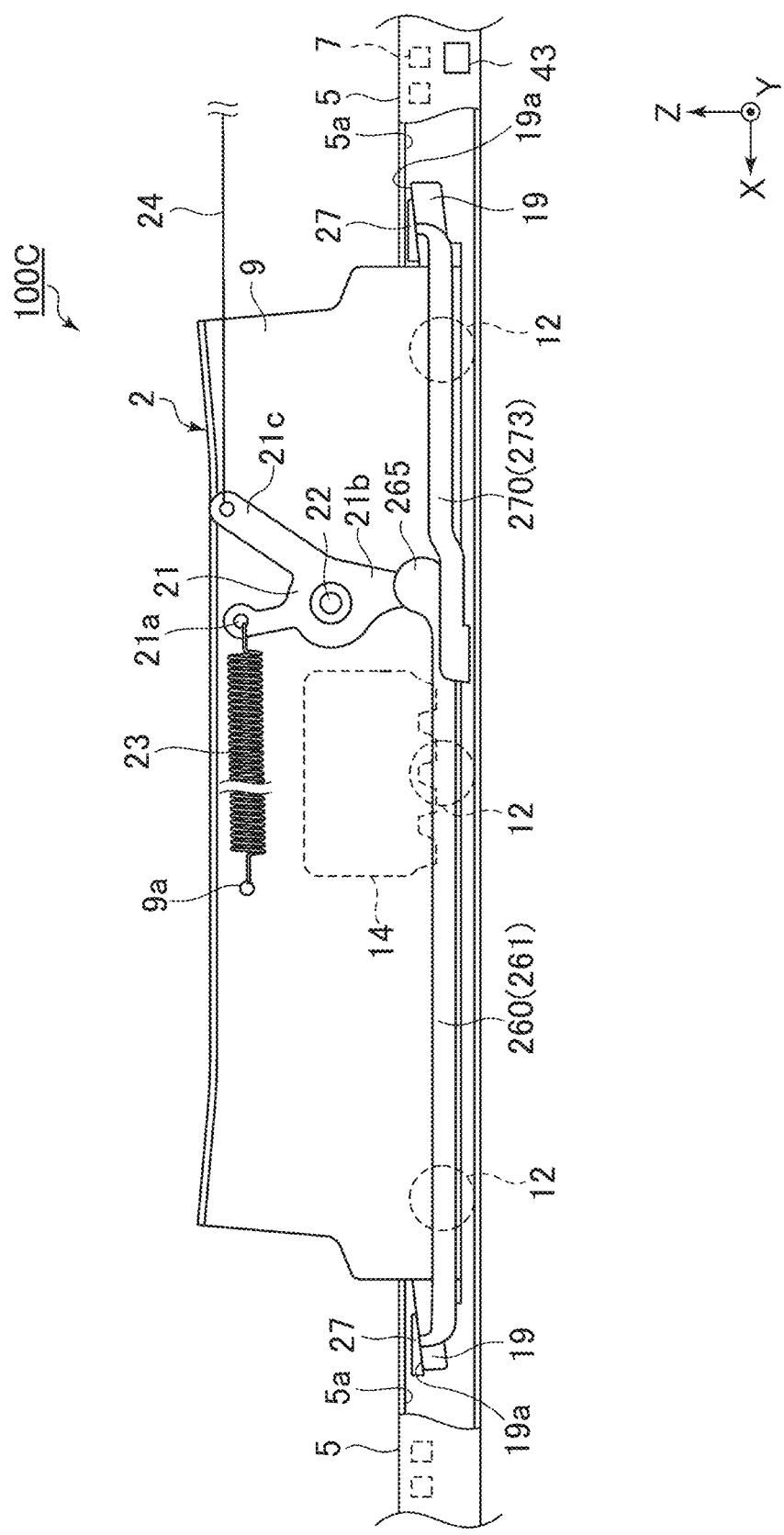
FIG. 12 is a diagram schematically showing the internal structure of a seat slide device according to a fourth embodiment of the present invention.

As a configuration example for solving this problem, a fourth embodiment of the present invention is explained. FIG. 12 is a diagram schematically showing the internal structure of a seat slide device 100C according to the second embodiment. In the following explanation, differences from the modification of the second embodiment shown in FIG. 8 are mainly explained. Explanation is omitted as appropriate concerning similarities to the modification.

In FIG. 12, reference sign 5a denotes the lower surface of the upper plate section 5. In the following explanation, the lower surface is written as "lower surface 5a". In FIG. 12, external shapes of the lock member 14 and the roller 12 are indicated by dotted lines to prevent illustration from being complicated.

Figure 8:
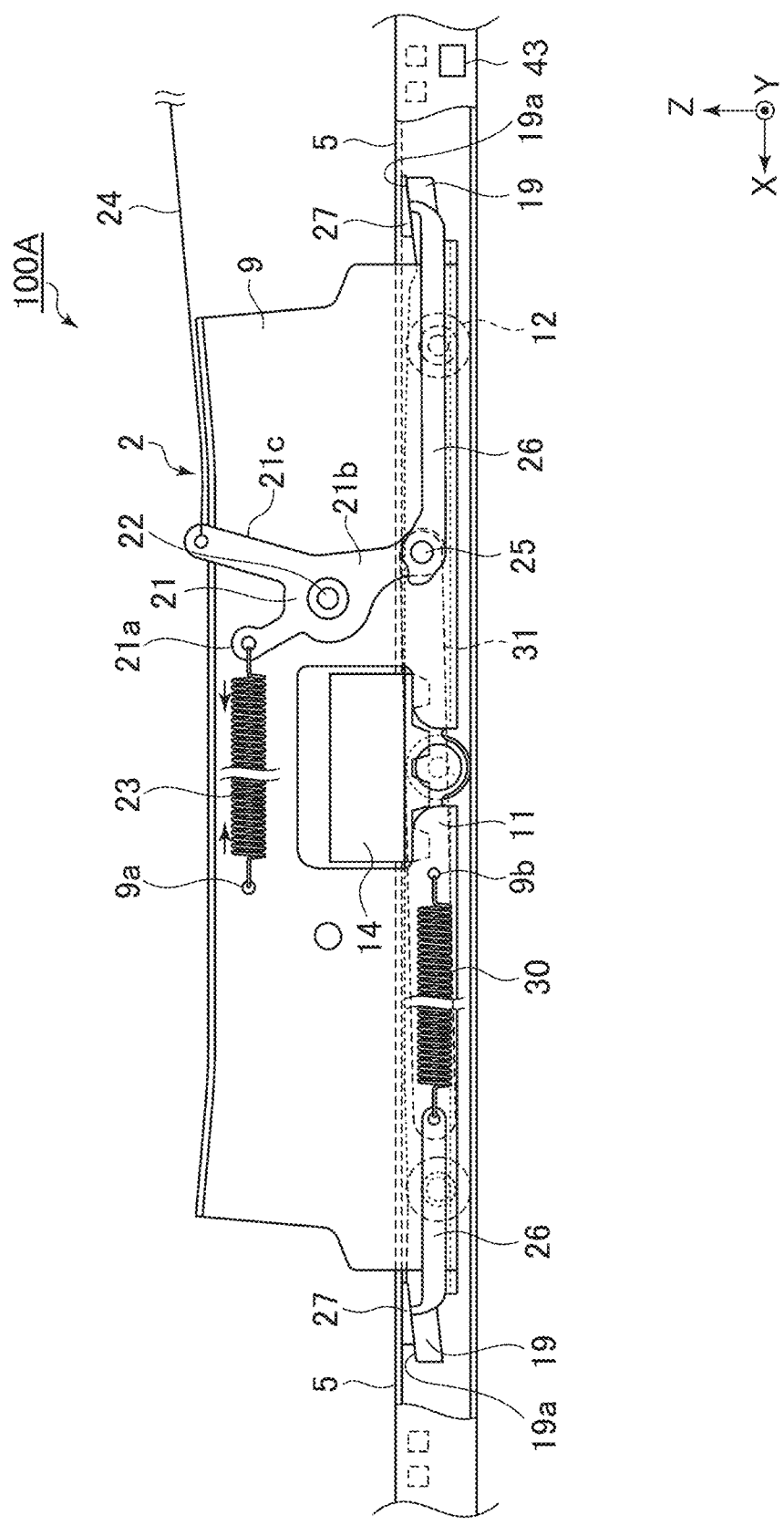
FIG. 8 is a diagram schematically showing the internal structure of a seat slide device according to a modification of the second embodiment of the present invention.

In this embodiment, as in the modification shown in FIG. 8, the inclined surfaces 19a are formed on the upper surfaces of the respective guide sections 19. Specifically, the inclined surface 19a formed in the guide section 19 on the forward side is inclined to be further away from the lower surface 5a further on the forward side. The inclined surface 19a formed in the guide section 19 on the rearward side is inclined to be closer to the lower surface 5a further on the rearward side.

In this embodiment, as in the embodiments explained above, the respective contact sections 27 disposed on the forward side and the rearward side of the vehicle can be considered members retained by the upper rail 2 and members held between the lower rail 1 (the upper plate section 5) and the upper rail 2 (the guide section 19) in order to increase the sliding resistance. The contact section 27 disposed on the forward side corresponds to a "first wedge member" in this embodiment. The contact section 27 disposed in a position further on the rearward side than the first wedge member corresponds to a "second wedge member" in this embodiment.

In this embodiment, a first slider 260 and a second slider 270 are provided instead of the pair of sliders 26, 26. The first slider 260 is a member that supports the contact section 27 on the forward side. The second slider 270 is a member that supports the contact section 27 on the rearward side.

The first slider 260 and the second slider 270 can be considered members that move the respective contact sections 27 in the same predetermined direction (specifically, the −x direction) and increase a frictional force working between the contact sections 27 and the lower rail 1 (the lower surface 5a) to thereby increase the sliding resistance. The first slider 260 disposed on the forward side corresponds to a "first supporting member" for moving the first wedge member in the −x direction and increasing a frictional force working between the first wedge member and the lower rail 1 (the lower surface 5a) to thereby increase the sliding resistance. The second slider 270 disposed in a position further on the rearward side than the first supporting member corresponds to a "second supporting member" for moving the second wedge member in the −x direction and increasing a frictional force working between the second wedge member and the lower rail 1 (the lower surface 5a) to thereby increase the sliding resistance.

Figure 13:
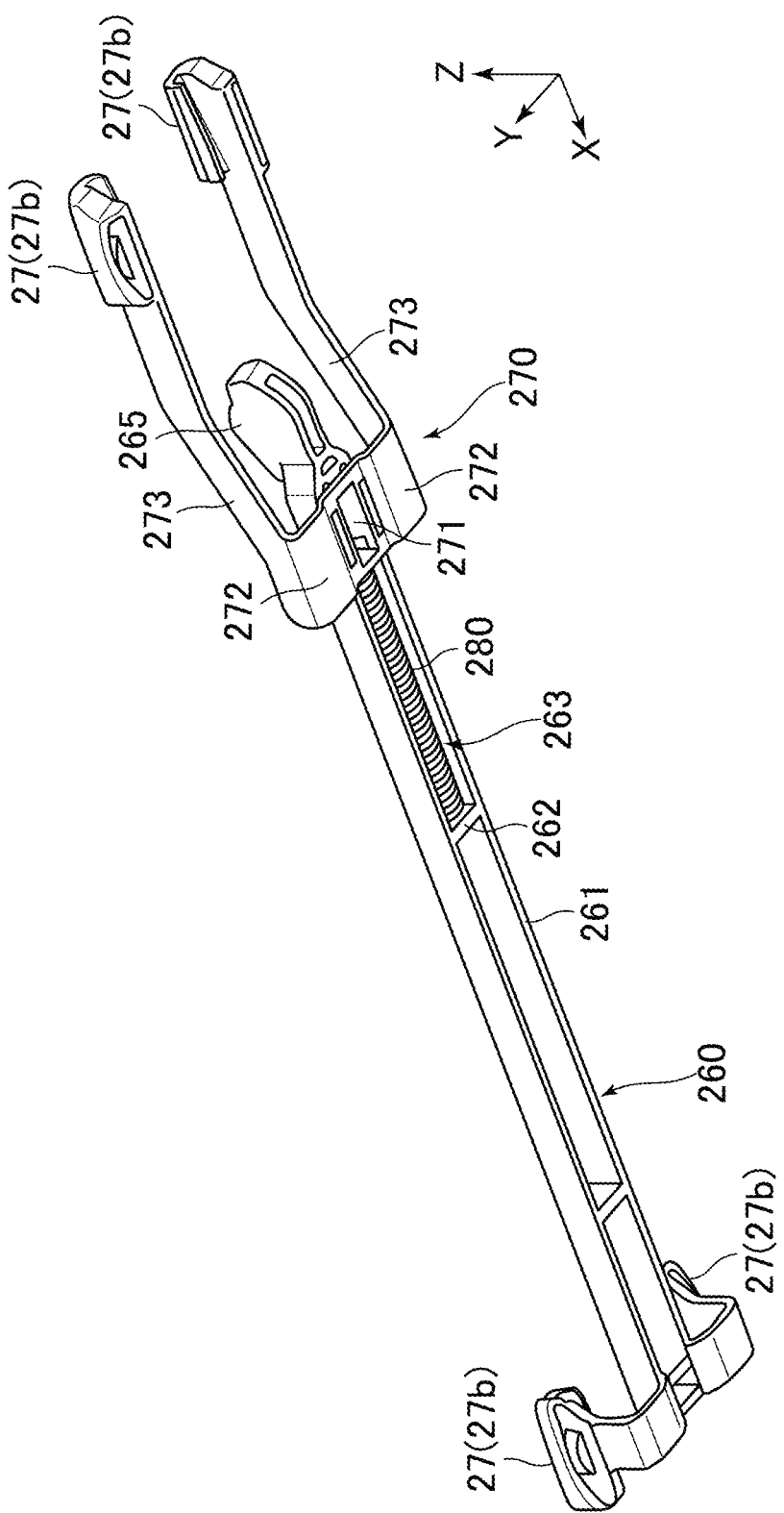
FIG. 13 is a perspective view showing the shapes of a first slider and a second slider.
Figure 14:
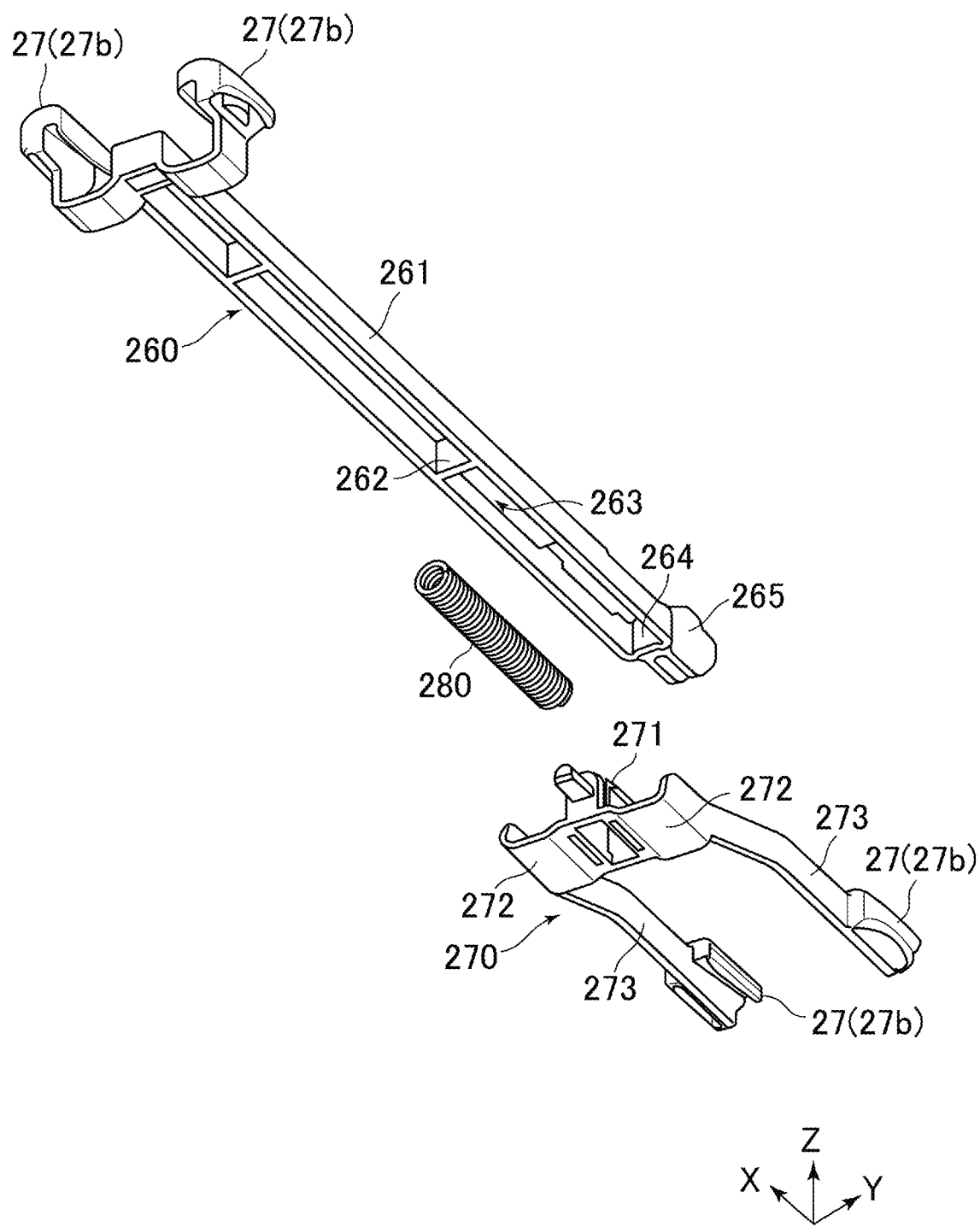
FIG. 14 is an exploded view showing the structures of the first slider and the second slider.
Figure 15:
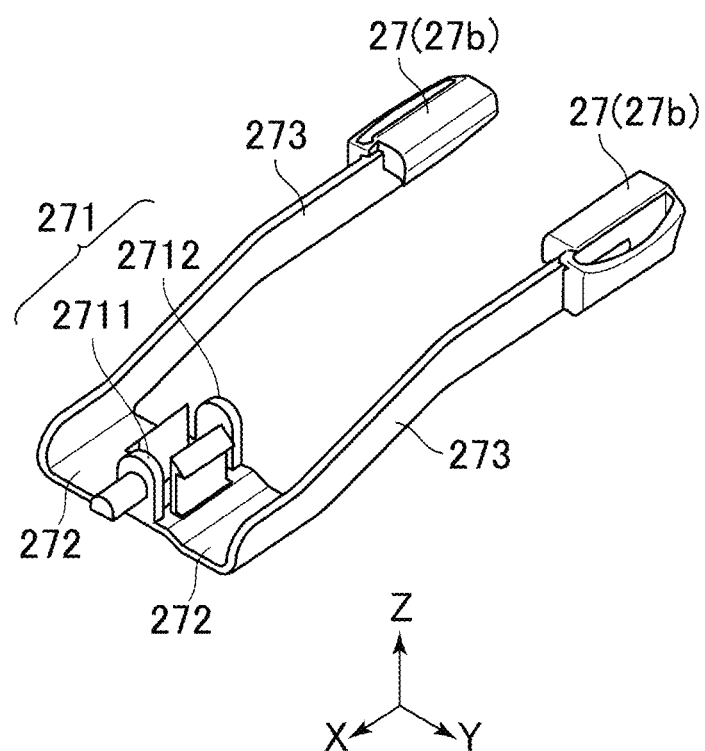
FIG. 15 is a perspective view showing the shape of the second slider.

Specific configurations of the first slider 260 and the second slider 270 are explained with reference to FIGS. 13 to 15. FIG. 13 is a perspective view drawn by viewing, from the downward side, the first slider 260 and the second slider 270 in a state in which the first slider 260 and the second slider 270 are assembled to each other. FIG. 14 is an exploded view of the first slider 260 and the second slider 270. FIG. 15 is a perspective view drawn by viewing the second slider 270 from the upward side.

The first slider 260 includes a linear section 261 formed in a bar shape. The linear section 261 is formed such that the external shape of a cross section perpendicular to the longitudinal direction of the linear section 261 is a rectangular shape. At the end portion on the +x direction side of the linear section 261, the contact sections 27 same as the contact sections 27 explained above with reference to FIGS. 5A and 5B are formed. A supporting section 265 is formed at the end portion on the −x direction side of the linear section 261. As shown in FIG. 12, the supporting section 265 is a portion rotatably supported with respect to the lower end portion of the lower arm section 21b of the second lever 21.

A concave section 263 recessed toward the +z direction side is formed on the surface on the −z direction side of the linear section 261. As shown in FIG. 14, the concave section 263 is formed in a portion on the −x direction side of the supporting section 265. A partition plate 262 is formed in a position at the end portion of the concave section 263 on the +x direction side. A partition plate 264 is formed in a position at the end portion of the concave section 263 on the −x direction side. Both of the partition plates 262 and 264 are formed in a flat shape perpendicular to the x axis.

As shown in FIG. 15, the second slider 270 includes an intermediate section 271, a pair of horizontal arms 272, and a pair of vertical arms 273. The intermediate section 271 is a center portion in the y direction of the second slider 270. A forward plate 2711 and a rearward plate 2712 are formed in the intermediate section 271. The forward plate 2711 is formed to project to the +z direction side in a position at the end portion on the +x direction side of the intermediate section 271. The rearward plate 2712 is formed to project to the +z direction side in a position at the end portion on the −x direction side of the intermediate section 271. Both of the forward plate 2711 and the rearward plate 2712 are formed in a flat shape perpendicular to the x axis.

The pair of horizontal arms 272 is portions formed to extend from the lower end of the intermediate section 271 respectively toward the −y direction and the +y direction. Both of the horizontal arms 272 are formed in a flat shape perpendicular to the z axis.

The pair of vertical arms 273 are portions formed to extend from the distal ends of the respective horizontal arms 272 toward the +z direction. Both of the vertical arms 273 are formed in a flat shape perpendicular to the y axis. The respective vertical arms 273 extend further toward the −x direction side than the rearward plate 2712. The contact sections 27 are formed in positions at the end portions on the −x direction side of the respective vertical arms 273. Unlike the configuration shown in FIGS. 5A and 5B, the contact sections 27 have a shape not including the intermediate sections 27*a* and including only the arm sections 27*b* (the intermediate section 271 in this embodiment can be considered an intermediate section corresponding to the intermediate section 27*a* shown in FIGS. 5A and 5B).

As shown in FIGS. 13 and 14, in the state in which the first slider 260 and the second slider 270 are assembled to each other, the intermediate section 271 of the second slider 270 is inserted into the concave section 263 of the first slider 260 from the downward side. The second slider 270 is capable of moving along the x axis with respect to the first slider 260 in a state in which the intermediate section 271 remains inserted into the concave section 263.

A coil spring 280 is disposed in the concave section 263. On end of the coil spring 280 is in contact with the partition plate 262 of the first slider 260. The other end of the coil spring 280 is in contact with the forward plate 2711 of the second slider 270. The coil spring 280 applies, to the partition plate 262 and the forward plate 2711, forces in directions for expanding a space between the partition plate 262 and the forward plate 2711 along the x axis. In other words, the coil spring 280 urges the first slider 260 to the +x direction side and urges the second slider 270 to the −x direction side. In a state in which an external force is not applied to the first slider 260 and the second slider 270 (i.e., the state shown in FIG. 13), the rearward plate 2712 of the second slider 270 is pressed against the partition plate 264 of the first slider 260.

In this way, the coil spring 280 is provided between the first slider 260 (the first supporting member) and the second slider 270 (the second supporting member). The coil spring 280 applies forces to expand a space between the first slider 260 and the second slider 270. The coil spring 280 corresponds to an "elastic member" in this embodiment. An elastic member of another form may be used instead of the coil spring 280.

The operation of the seat slide device 100C is explained. In FIG. 12, the lock state is established by the lock mechanism 13. The wire 24 is pulled in the rearward direction of the vehicle. The second lever 21 swings clockwise around the rotating shaft 22. As a result, the first slider 260 and the contact section 27 at the distal end of the first slider 260 move in the +x direction. A gap is formed between the contact section 27 and the lower surface 5*a* of the upper plate section 5.

The rearward plate 2712 and the partition plate 264 are in contact with each other. Therefore, according to the clockwise swing of the second lever 21, the second slider 270 and the contact section 27 at the distal end of the second slider 270 move in the −x direction. A gap is formed between the contact section 27 and the lower surface 5*a* of the upper plate section 5.

As explained above, in the state shown in FIG. 12, both of the contact section 27 on the forward side and the contact section 27 on the rearward side are not in contact with the lower surface 5*a*. Therefore, both of the sliding resistance in sliding the seat to the forward side (the third sliding resistance) and the sliding resistance in sliding the seat to the rearward side (the fourth sliding resistance) decrease.

Figure 16:
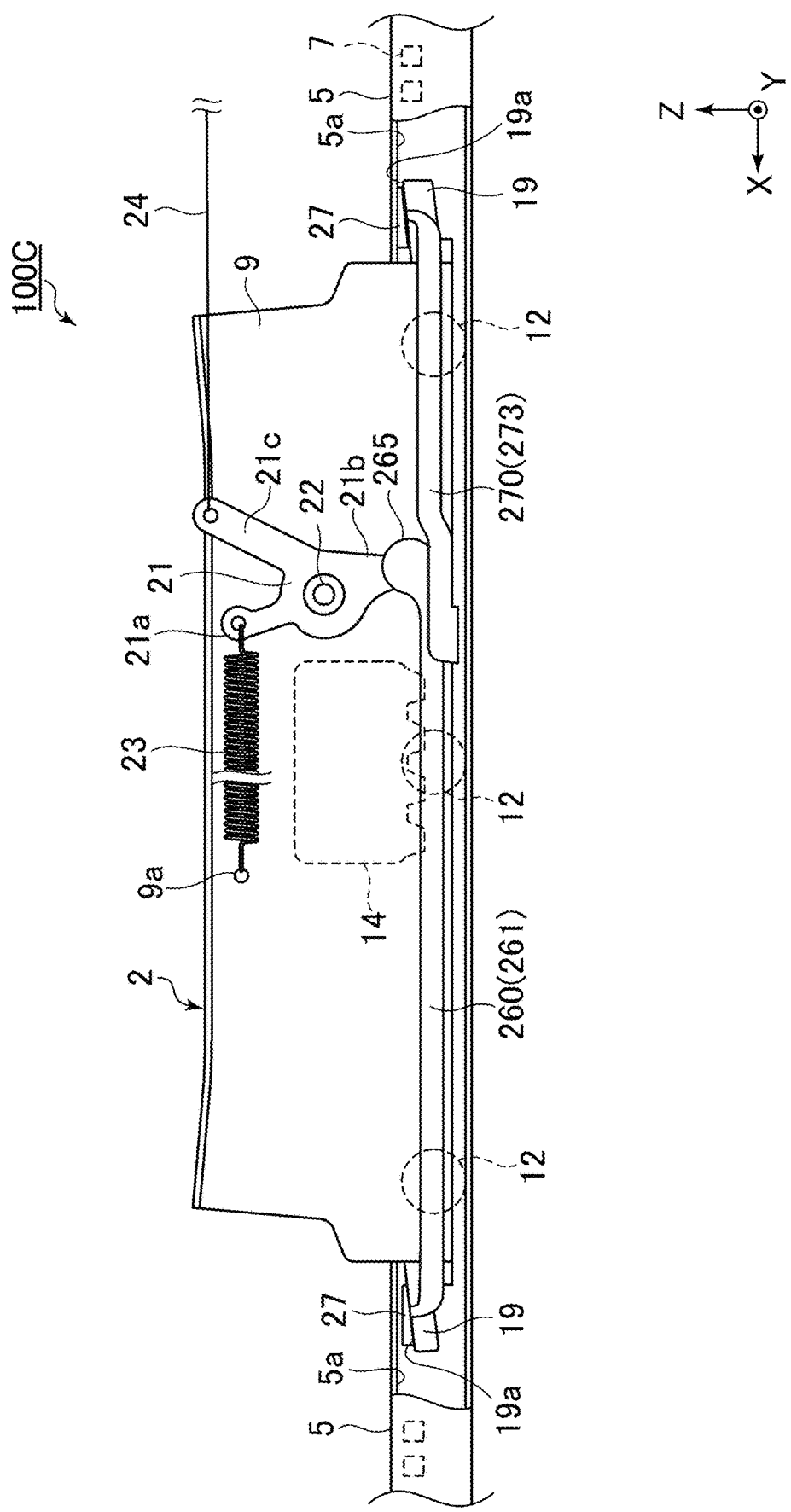
FIG. 16 is a diagram for explaining motions of the first slider and the second slider.

When a force for pulling the wire 24 toward the rearward side is reduced from the state shown in FIG. 12, the second lever 21 swings counterclockwise around the rotating shaft 22 with the elastic restoration force of the coil spring 23. In FIG. 16, a stage halfway in the swing is schematically shown. In a state shown in FIG. 16, the first slider 260 and the second slider 270 respectively move to the −x direction side according to the swing of the second lever 21. Consequently, the contact section 27 on the rearward side provided in the second slider 270 is held between the inclined surface 19*a* and the lower surface 5*a* of the upper plate section 5 like a wedge.

On the other hand, in a state immediately after the contact section 27 on the rearward side comes into contact with the lower surface 5*a* (i.e., the state shown in FIG. 16), the contact section 27 on the forward side does not come into contact with the lower surface 5*a* yet. In this way, in the seat slide device 100C, the length and the like of the linear section 261 are designed such that the contact section 27 on the rearward side comes into contact with the lower surface 5*a* first.

When the force for pulling the wire 24 to the rearward side is further reduced from the state shown in FIG. 16, the second lever 21 further swings counterclockwise with the elastic restoration force of the coil spring 23. At this point, since the contact section 27 on the rearward side is already in contact with the lower surface 5*a*, the second slider 270 does not further move to the −x direction side. That is, when the seat slide device 100C shifts from the state shown in FIG. 16 to the state shown in FIG. 17, the position of the second slider 270 along the x axis does not change.

Figure 17:
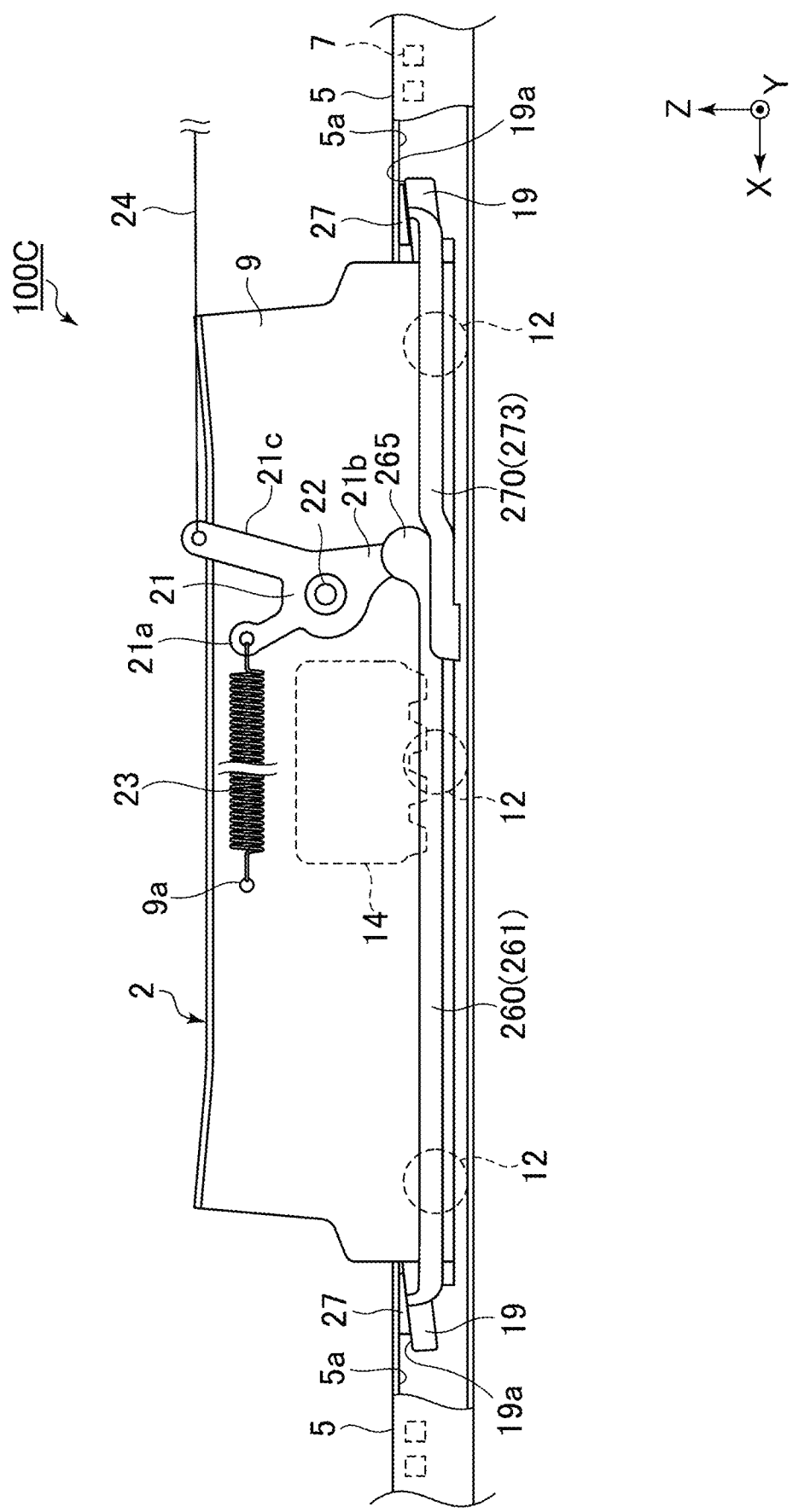
FIG. 17 is a diagram for explaining the motions of the first slider and the second slider.
Figure 18:
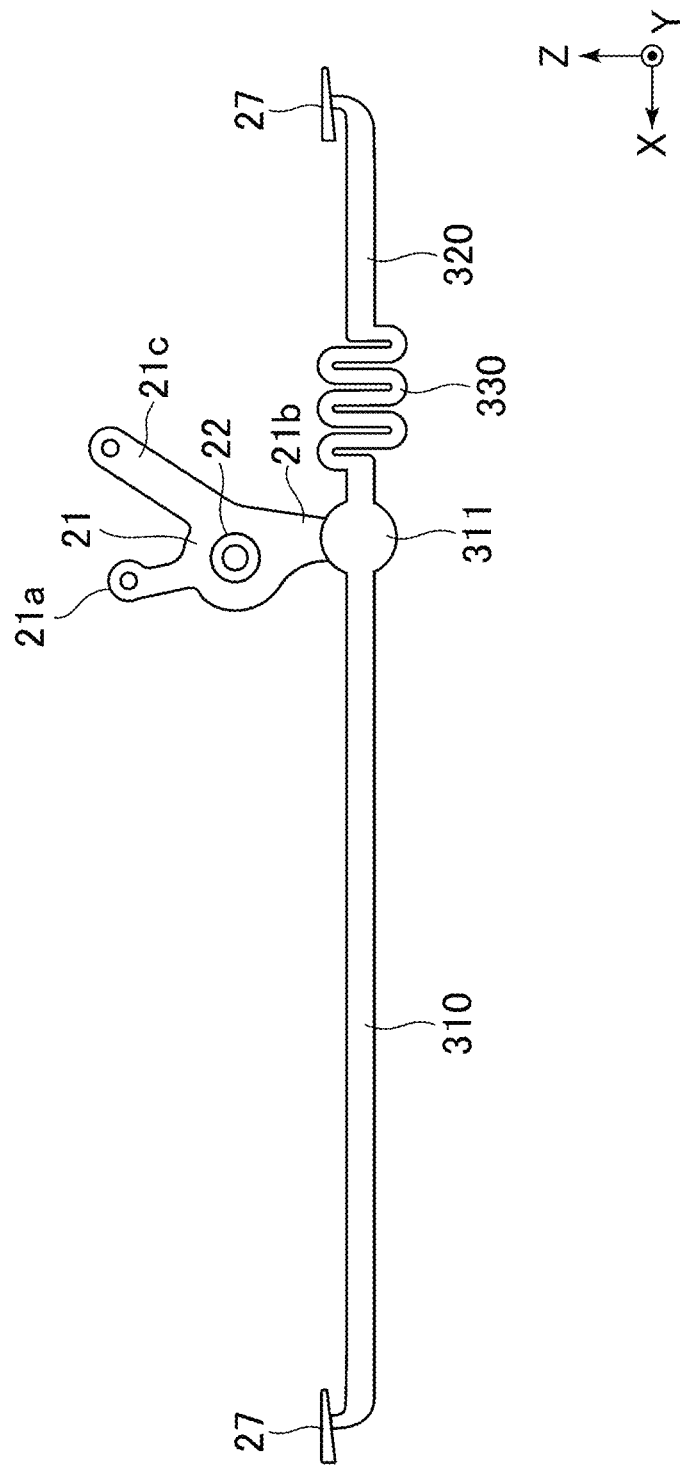
FIG. 18 is a diagram showing the shapes of a first slider and a second slider of a seat slide device according to a modification of the fourth embodiment.

On the other hand, the first slider 260 further moves to the −x direction side while resisting an elastic restoration force of the coil spring 280. At this point, the first slider 260 moves relatively to the (stationary) second slider 270. In other words, the intermediate section 271 of the second slider 270 relatively slides on the inside of the concave section 263. Finally, as shown in FIG. 17, the contact section 27 on the forward side provided in the first slider 260 is held between the inclined surface 19*a* and the lower surface 5*a* of the upper plate section 5 like a wedge.

In this way, in this embodiment, when the second lever 21 rotates counterclockwise, the contact section 27 on the rearward side is brought into contact with the lower surface 5*a* first. However, the contact section 27 on the forward side can also be brought into contact with the lower surface 5*a*. Even when an error occurs in the dimensions of the first slider 260 and the like, it is possible to surely bring the respective contact sections 27 into contact with the lower surface 5*a*. Therefore, it is possible to set the magnitude of the sliding resistance in moving the seat to magnitude as designed.

The second lever 21 moves the first slider 260, which is the first supporting member, to the −x direction side to thereby increase the sliding resistance. The second lever 21 corresponds to a "lever member" in this embodiment.

In this embodiment, the first slider 260 that supports the contact section 27 on the forward side and the second slider 270 that supports the contact section 27 on the rearward side are configured as components separate from each other. Instead of such a form, as in a modification shown in FIG. 18, a form may be adopted in which a first slider section 310 and a second slider section 320 are integrally formed. The first slider section 310 is a portion corresponding to a "first supporting member" in this modification. The second slider section 320 is a portion corresponding to a "second supporting member" in this modification.

In this modification, the first slider section 310 and the second slider section 320 are joined by a spring section 330. The first slider section 310, the second slider section 320, and the spring section 330 are formed as an integral component as a whole. The spring section 330 is a portion corresponding to an "elastic member" in this modification.

A supporting section 311 is formed in a portion closer to the spring section 330 in the first slider section 310. Like the supporting section 265 in the fourth embodiment (FIG. 12), the supporting section 311 is a portion rotatably supported with respect to the lower end portion of the lower arm section 21b of the second lever 21.

In such a configuration, in addition to effects same as the effects explained in the fourth embodiment, there is an effect that it is possible to reduce the number of components for configuring the first supporting member and the second supporting member.

The embodiments of the present invention are explained above with reference to the specific examples. However, the present invention is not limited to the specific examples. That is, the specific examples added with design changes as appropriate by those skilled in the art are also included in the scope of the present invention as long as the specific examples include the features of the present invention. For example, the components and the dispositions, the materials, the conditions, the shapes, the sizes, and the like of the components included in the specific examples explained above are not limited to the illustrated ones and may be changed as appropriate. The components included in the embodiments can be combined as long as the combinations are technically possible. The combinations of the components are included in the scope of the present invention as long as the combinations include the features of the present invention.

What is claimed is:

1. A seat slide device provided in a vehicle, the seat slide device comprising:
   a lower rail fixed to a floor of a vehicle;
   an upper rail fixed to a seat of the vehicle and supported to be capable of sliding with respect to the lower rail;
   a lock configured to switch a lock state in which movement of the upper rail is restricted and an unlock state in which the movement of the upper rail is allowed;
   a slide adjuster configured to adjust sliding resistance of sliding of the upper rail with respect to the lower rail in the unlock state,
   a first wedge member retained by the upper rail and held between the lower rail and the upper rail in order to increase the sliding resistance;
   a first supporting member configured to move the first wedge member in a predetermined direction and increase a frictional force working between the first wedge member and the lower rail to thereby increase the sliding resistance;
   a second wedge member retained by the upper rail in a position further on a rearward side than the first wedge member and held between the lower rail and the upper rail in order to increase the sliding resistance;
   a second supporting member configured to move the second wedge member in the predetermined direction and increase a frictional force working between the second wedge member and the lower rail to thereby increase the sliding resistance
   a lever member configured to move the first supporting member in the predetermined direction; and
   an elastic member provided between the first supporting member and the second supporting member,
   the elastic member configured to apply forces to expand a space between the first supporting member and the second supporting member.

2. The seat slide device according to claim 1, wherein the slide adjuster is configured to change the sliding resistance between a first condition and a second condition, the sliding resistance in the first condition being set to a first sliding resistance at a time of movement in a first direction and being set to a second sliding resistance smaller than the first sliding resistance at a time of movement in a second direction opposite to the first direction, the sliding resistance in the second condition being set to a third sliding resistance smaller than the first sliding resistance at the time of the movement in the first direction and being set to a fourth sliding resistance smaller than the first sliding resistance at the time of the movement in the second direction.

3. The seat slide device according to claim 2, wherein the third sliding resistance and the fourth sliding resistance are smaller than the second sliding resistance.

4. The seat slide device according to claim 3, wherein the first condition is a condition at a sitting time when an occupant sits on the seat, and
   the second condition is a condition at a non-sitting time when the occupant does not sit on the seat.

5. The seat slide device according to claim 2, wherein the first condition is a condition at a sitting time when an occupant sits on the seat, and
   the second condition is a condition at a non-sitting time when the occupant does not sit on the seat.

6. The seat slide device according to claim 2, wherein the slide adjuster is configured to change the sliding resistance between a state in which at least one of a seatback of the seat and a seat cushion of the seat is folded with respect to another and a state in which the at least one of the seatback of the seat and the seat cushion of the seat is not folded with respect to the other of the seatback of the seat and the seat cushion of the seat.

7. The seat slide device according to claim 1, further comprising
   a sensor configured to detect inclination of the seat slide device, wherein
   the slide adjuster is configured to adjust the sliding resistance according to a magnitude of inclination of the seat slide device detected by the sensor.

8. The seat slide device according to claim 1, wherein the first supporting member, the second supporting member, and the elastic member are integrally formed as a whole.

* * * * *

UNITED STATES PATENT AND TRADEMARK OFFICE
CERTIFICATE OF CORRECTION

PATENT NO. : 10,717,373 B2
APPLICATION NO. : 15/632193
DATED : July 21, 2020
INVENTOR(S) : Hisato Watanabe et al.

Page 1 of 1

It is certified that error appears in the above-identified patent and that said Letters Patent is hereby corrected as shown below:

On the Title Page

Item (72), should read:
--(72) Inventors: Hisato Watanabe, Takahoma-Shi (JP);
Shin Shiraki, Takahoma-Shi (JP);
Motohisa Nakamura, Takahoma-Shi (JP);
Takuo Yanagihara, Takahoma-Shi (JP)--

Signed and Sealed this
First Day of September, 2020

Andrei Iancu
*Director of the United States Patent and Trademark Office*